United States Patent [19]
MacLeay et al.

[11] Patent Number: 4,981,915
[45] Date of Patent: Jan. 1, 1991

[54] MULTIPURPOSE POLYMER BOUND STABILIZERS

[75] Inventors: Ronald E. MacLeay; Terry N. Myers, both of Williamsville, N.Y.

[73] Assignee: Atochem North America, Inc., Philadelphia, Pa.

[21] Appl. No.: 370,529

[22] Filed: Jun. 23, 1989

Related U.S. Application Data

[62] Division of Ser. No. 84,529, Aug. 12, 1987, Pat. No. 4,863,999.

[51] Int. Cl.$^5$ ............................................. C08F 8/32
[52] U.S. Cl. ............................... 525/327.6; 525/327.5; 525/329.6; 525/343; 525/375; 525/379; 525/380; 525/381; 525/382
[58] Field of Search ............... 525/327.5, 327.6, 329.6

[56] References Cited

U.S. PATENT DOCUMENTS

| | | |
|---|---|---|
| 2,971,939 | 2/1961 | Baer . |
| 3,257,354 | 6/1966 | Dexter et al. . |
| 3,336,267 | 8/1967 | Zimmerman et al. . |
| 3,488,311 | 1/1970 | Burdick et al. . |
| 3,509,110 | 4/1970 | Di Giulio et al. . |
| 3,553,177 | 1/1971 | Hazen et al. . |
| 3,555,001 | 1/1971 | Wallis et al. . |
| 3,560,455 | 2/1971 | Hazen et al. . |
| 3,560,456 | 2/1971 | Hazel et al. . |
| 3,560,457 | 2/1971 | Hazen et al. . |
| 3,629,192 | 12/1971 | Heller et al. . |
| 3,723,375 | 3/1973 | Field et al. . |
| 3,884,882 | 5/1975 | Caywood, Jr. . |
| 3,919,354 | 11/1975 | Moore et al. . |
| 3,998,907 | 12/1976 | DiGiulio . |
| 4,097,551 | 6/1978 | DiGiulio et al. . |
| 4,108,943 | 8/1978 | Lee . |
| 4,153,596 | 5/1979 | Oertel et al. . |
| 4,276,401 | 6/1981 | Karrer . |
| 4,381,373 | 4/1983 | Ikuma . |
| 4,413,096 | 11/1983 | Fu et al. . |
| 4,486,570 | 12/1984 | Lordi et al. . |
| 4,522,983 | 6/1985 | Le-Khac et al. . |
| 4,522,992 | 6/1985 | Vergrugge . |
| 4,523,008 | 6/1985 | Vogl et al. . |
| 4,591,619 | 5/1986 | Kitsunai . |
| 4,692,486 | 9/1987 | Gugumus . |
| 4,730,017 | 3/1988 | Avar . |

FOREIGN PATENT DOCUMENTS

| | | |
|---|---|---|
| 1180497 | 1/1985 | Canada . |
| 0076691 | 4/1983 | European Pat. Off. . |
| 0084882 | 8/1983 | European Pat. Off. . |
| 59-221314 | of 0000 | Japan . |
| 59221315 | of 0000 | Japan . |
| 6902719 | 2/1969 | Japan . |
| 2145100A | 3/1985 | United Kingdom . |
| 2174093A | 10/1986 | United Kingdom . |

OTHER PUBLICATIONS

G. De Vito, et al., "Functionalization of an Amorphous Ethylene-Propylene Copolymer by Free Radical Initiated Grafting of Unsaturated Molecules", Jour. of Poly. Science: Poly. Chem. Ed., vol. 22, pp. 1335–1347 (1984).
G. Scott, "New Developments in Rubber-Bound Antioxidants", Rubbercon '77, Dept. of Chem., Univ. of Aston in Birmingham, pp. 19/1–19/18.
W. Dickstein, et al., "Functional Polymers, XXVI. Co-and Terpolymers Involving Methacrylates, N-Vinylpyrollidone, and Polymerizable Ultraviolet Stabilizers and Antioxidants", J. Macromol. Sci. Chem. A22(4), pp. 387–402 (1985).
D. Bailey, et al., "Polymeric Ultraviolet Absorbers", J. Macromol Sci., Rev. Macromol Chem., C14(2), pp. 267–293 (1976).
J. Fertig, et al., "Ultraviolet Stabilizing Monomers and Polymers, II. Synthesis & Polymerization of Acrylate and Methacrylate Derivatives of 2,1-Dihydroxybenzophenone", Journal of Applied Polymer Science, vol. 10, pp. 663–672 (1966).
G. Scott, "Substantive Antioxidants", Dev. Polym. Stab., vol. 4, pp. 181–221 (1981).
F. E. Karrer, "Polymere 2,2,6,6-Tetraalkylpiperidin-Derivate, 1", Makromol Chem., vol. 181, pp. 595–633 (1980).
J. A. Kuczkowski, et al., "Polymer-Bound Antioxidants", Rubber Chemistry and Technology, 57:621–651 (1984).

Primary Examiner—Bernard Lipman
Attorney, Agent, or Firm—Panitch Schwarze Jacobs & Nadel

[57] ABSTRACT

Polymer bound stabilizer compounds are provided in which two or more different classes of stabilizers are chemically bound to anhydride containing polymers or copolymers. Polymeric stabilizers are prepared by the reaction of primary amino or hydrazido substituted stabilizers (i.e., antioxidants, light stabilizers, etc.) with some or all of the anhydride groups of the polymer or copolymer to form pendant stabilizer substituted imide or amic acid groups. The polymer bound stabilizers are not lost from the polymer system by volatilization, migration or extraction, even at high temperatures. The polymer bound stabilizer compounds may be used as concentrates to stabilize other polymer systems.

25 Claims, No Drawings

4,981,915

MULTIPURPOSE POLYMER BOUND STABILIZERS

This is a division of application Ser. No. 084,529, filed Aug. 12, 1987, now U.S. Pat. No. 4,863,999.

BACKGROUND OF THE INVENTION

This invention relates to polymer bound stabilizers and more particularly to combinations of polymer bound UV stabilizers and/or polymer bound antioxidants, preferably where the stabilizing groups provide a synergistic effect. This invention also relates to the use of these polymer bound stabilizers to stabilize polymers or polymer blends against thermal and/or photooxidative degradation.

When exposed to sunlight or to strong fluorescent illumination, most plastics undergo degradation. This usually results in color development and loss of physical properties. To overcome these problems polymers are normally protected against photochemical attack by the incorporation of ultraviolet stabilizers, hindered amine light stabilizers, ultraviolet quenchers, peroxide decomposers, free radical chain breakers, or combinations of the above.

Three factors affect the performance of the stabilizer in a polymer composition: the intrinsic activity of the stabilizer functional group on a molar basis, the compatibility or solubility of the stabilizer in the polymer system, and the ability of the stabilizer to remain in the polymer system. The third factor is often the dominant factor (J. K. Kuczkowski, J. G. Gillick, Ruber Chemistry and Technology, 57, pp 621–651 (1984); G. Scott, New Development in Rubber-bound Antioxidants, Rubbercon 77, Int. Rubber Conf., 1977, 1, paper #19). Consequently, there has been a considerable amount of effort in the development of stabilizers that are less volatile, more compatible and less readily lost during fabrication and exposure to the environment. Engineering thermoplastics are processed at high temperatures so it is essential to use high molecular weight stabilizers that are not lost through drying, extrusion and molding steps. For polymers that come in contact with foodstuffs it is important that the stabilizers be non-toxic or non-extractable from the polymer into the foodstuff. Obviously, polymer bound stabilizers are preferred where FDA approval is required in the end-use.

Various approaches have been used to overcome volatility and compatibility shortcomings. For example, stearyl and lauryl diesters of thiodipropionic acid are commonly employed to overcome the volatility and odor problem of the lower molecular weight esters. Tetraesters of pentaerythritol, such as Irganox 1010 (product of Ciba Geigy) are also extensively used to minimize volatility problems. Multifunctional stabilizers have been prepared by reacting one type of stabilizer with another to obtain a higher molecular weight compound having dual functionality or by reacting two or more stabilizers with a multifunctional coupling agent (e.g., cyanuric chloride) in a stepwise fashion (U.S. Pat. No. 3,257,354).

Another approach to solving the volatility and migration problems of the stabilizers has been to prepare stabilizers with polymerizable groups and then either polymerize the monomeric stabilizers to homopolymers or copolymerize the stabilizer with the monomer of the polymer requiring stabilization. (J. Fertig, A. I. Godberg, M. Shoultchi, J. Appl. Polym. Sci., 10, pp 672 (1966); G. Scott, Developments in Polymer Stabilization, Vol 4, G. Scott, Ed., App. Sci. Pub., London, 1981, pp 181–221).

The more popular approach is to copolymerize the polymerizable stabilizer with another monomer. There are numerous examples of copolymerizable antioxidants and copolymerizable UV stabilizers found in the literature (F. E. Karrer, Makromol. Chem., 181, pp 595–633 (1980); J. K. Kuczkowski, J. G. Gillick, Rubber Chemistry and Technology, 57, pp 621–651 (1984); D. Bailey, D. Vogl, J. Macromol. Sci. Rev. Macromol. Chem., C14(2), pp 267–293 (1976)).

Six examples of polymers or copolymers with multiple bound UV stabilizers and antioxidants have been found. In the first (W. Dickstein, D. Vogl, J. Macromol. Sci. -Chem., A22(4), pp 387–402 (1985)), copolymerizations and terpolymerizations with a combination of a polymerizable N-phenylbenzotriazole and a polymerizable hindered phenol were carried out with methacrylate esters, N-vinylpyrrolidone, and 1,1,1-tris(trimethylsiloxy)methacrylatopropylsilane. The copolymerizable UV stabilizers were 2-(2-hydroxy-5-isopropenylphenyl)-2H-benzotriazole and 2-(2-hydroxy-5-vinylphenyl)-2H-benzotriazole and the copolymerizable antioxidant was 4-isopropenyl-2,6-di-t-butylphenol.

The second example (U.S. Pat. No. 4,523,008) involves a mixture of the same copolymerizable UV stabilizers and copolymerizable antioxidants which were copolymerized with an unsaturated polyester and styrene.

The third example (U.S. Pat. No. 4,276,401) describes polymer bound multifunctional light stabilizers prepared by copolymerizing N-substituted acrylamide or methacrylamide monomers. One of the monomers contained a hindered amine substituent and the other monomer contained a light stabilizing substituent.

In the fourth example (G. Scott, New Developments in Rubber-Bound Antioxidants, Rubbercon 77, Int. Rubber Conf., 1977, 1, paper #19), antioxidants and UV stabilizers containing thiol groups were attached to rubber modified thermoplastics such as ABS or other rubber latices using peroxide initiators.

In the fifth example of multiple polymer bound stabilizers, Borg-Warner patented the method of attaching the above mentioned thiol antioxidants and thiol UV stabilizers to rubber modified thermoplastics in the presence of a peroxide initiator in a melt processing step (European Patent Appln. 84,882; CA99: 141092n).

There has been a considerable amount of activity in the preparation of polymer bound stabilizers by modifying copolymers containing reactive functionalities with stabilizers containing groups that react with the reactive functionality of the copolymer (the sixth example). An example of such a modification is the transesterification of ethylene-ethyl acrylate copolymers with 2,2,6,6-tetramethylpiperidin-4-ol (U.S. Pat. No. 4,413,096). Japanese Patent No. 69/02,719 (CA70: 1071524y) is the only example where a functionalized copolymer is reacted with a mixture of reactive (glycidyl substituted) stabilizers (sulfide and hindered phenol antioxidants) to provide a synergistic system.

SUMMARY OF THE INVENTION

This invention is directed to a polymer containing recurring units selected from the formulas

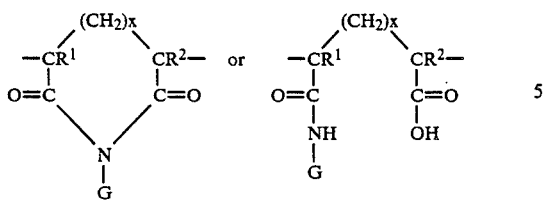

or both in which the units occur either in the polymer backbone, on grafted side chains, as pendant units, or as combinations thereof and wherein x is 0 or 1, $R^1$ and $R^2$ are independently selected from hydrogen, alkyl of 1-6 carbons, cycloalkyl of 5-7 carbons, phenyl, chlorine, or bromine and $$-\overset{|}{\underset{\underset{G}{|}}{N}}-$$

is the residue of a primary amino or hydrazido substituted stabilizer group selected from (a) hindered phenols, (b) hindered amine light stabilizers, (c) dialkyl sulfides, (d) 2-hydroxybenzophenones, (e) 2-(2-hydroxyphenyl)-2H-benzotriazoles, (f) secondary aromatic amines, (g) heterocyclic stabilizers, (h) salicylic acid derivatives, (i) salicylate esters, and (j) oxamide derivatives, with the proviso that at least two different groups from (a) through (j) are attached to the polymer.

This invention further comprehends a method of using the multiple bound stabilizer polymer mentioned above for stabilizing other polymers such as polyolefins, polycarbonates, poly(phenylene oxide) and poly(phenylene ether) blends, nylons, polyesters and styrenic copolymers such as HIPS (polybutadiene-styrene graft copolymer), ABS (polybutadiene-acrylonitrile/styrene graft copolymer), MBS (methyl methacrylate/-butadiene/styrene terpolymer) and SAN (styrene/acrylonitrile copolymer).

DETAILED DESCRIPTION OF INVENTION

In accordance with the invention there is provided a novel class of polymers containing pendant stabilizer groups which are prepared from:
(a) cyclic anhydride containing polymers or copolymers and reactive stabilizer groups with primary amino or hydrazide functionality; or
(b) the copolymerization of ethylenic or vinyl aromatic monomers with N-substituted imides (or N-substituted amic acids) of cyclic alpha, beta -unsaturated dicarboxylic acid anhydrides where the N-substitutents contain stabilizing groups.

Preferably, the cyclic anhydride containing polymer or copolymer is a copolymer of maleic anhydride. The polymer bound stabilizer groups are attached as pendant N-substitutents on the imide group of the polymer or as N-substitutents of intermediate amic acids which are capable of cyclizing to the imide group upon heating above 200° C. In addition there is more than one class of stabilizer group attached to the polymer. Preferably, the combinations of two or more stabilizers on the backbone form a synergistic system. Group classes of stabilizers are described by the following list of general structures.

(a) Hindered phenols of general structure:

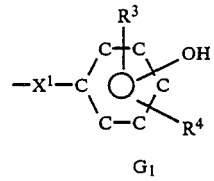

wherein
$R^3$ is t-alkyl of 4 to 8 carbons. $R^4$ is hydrogen, t-alkyl of 4 to 8 carbons or alkyl of 1 to 8 carbons. $X^1$ is a direct bond or a divalent radical selected from
—NH—C(=O)—(CH$_2$)$_b$—C(=O)—NH—, —NH—C(=O)—(CH$_2$)$_b$—, —NH—C(=O)—(CH$_2$)$_b$—S—CH$_2$—, —(CH$_2$)$_y$—, —NH—C(=O)—O—(CH$_2$)$_b$, —NH—C(=O)—(CH$_2$)$_b$—Q—, —NH—C(=O)—C(CH$_3$)$_2$—, or —CH$_2$—CH$_2$—O—
in which b is 0, 1 or 2, y is selected from 1, 2 or 3. Q is selected from —NH—, —S—, or —O—. [N.B. In the definitions of $X^1$, $X^2$, $X^3$, $X^4$, $X^5$, $X^6$, $X^7$, and $X^8$, the orientation of the radical is such that the polymer is connected to the left end of the group as shown.] Preferably, the hydroxy group is in the 4 position, $R^3$ is a t-butyl or t-amyl group in the 5 position of the phenyl ring, and $X^1$ is —NH—C(=O)—(CH$_2$)$_b$—C(=O)—NH—, —NH—C(=O)—(CH$_2$)$_b$—, —NH—C(=O)—(CH$_2$)$_b$—S—CH$_2$— or —NH—C(=O)—(CH$_2$)$_b$—Q—. Most preferably, $X^1$ is —NH—C(=O)—(CH$_2$)$_b$— or —NH—C(=O)—(CH$_2$)$_b$—S—CH$_2$—.

(b) Hindered amines of general structure:

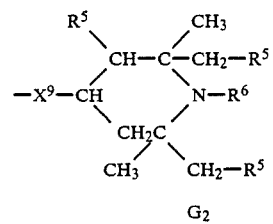

where:
$R^5$ is hydrogen or alkyl of 1 to 4 carbons. $R^6$ is hydrogen, oxyl, hydroxyl, alkyl of 1 to 20 carbons, alkenyl or alkynyl of 3 to 8 carbons, aralkyl of 7 to 12 carbons, aliphatic acyl of 1 to 10 carbons, aromatic acyl of 7 to 13 carbons, alkoxycarbonyl of 2 to 9 carbons, aryloxycarbonyl of 7 to 15 carbons, alkyl, aryl, cycloalkyl or aralkyl substituted carbamoyl of 2 to 13 carbons, hydroxyalkyl of 1 to 5 carbons, 2-cyanoethyl, epoxyalkyl of 3 to 10 carbons or a polyalkylene oxide group of 4 to 30 carbons.

$X^9$ is a direct bond or a divalent radical selected from
—N(R$^{20}$)—C(=O)—R$^{21}$—Z—, —N(R$^{20}$)—C(=O)—Z—, —N(R$^{20}$)—C(=O)—R$^{22}$—C(=O)—Z—, —N(R$^{20}$)—C(=O)—R$^{21}$—, —N(R$^{20}$)—C(=O)—, —N(R$^{20}$)—C(=O)—(CH$_2$)$_b$—S—CH$_2$—, —(CH$_2$)$_y$—, —CH$_2$—CH$_2$—O—, and —R$^7$—NH— b and y are as previously defined.
Z is selected from —N(R$^{23}$)—, —S—, —O— and —N(R$^{24}$)—R$^7$—N(R$^{24}$)—.
$R^7$ is an alkylene diradical of 2 to 12 carbons.

$R^{20}$ is hydrogen, primary or secondary alkyl of 1 to 8 carbons, aralkyl of 7 to 12 carbons or cycloalkyl of 5 to 12 carbons.

$R^{21}$ is an alkylene diradical of 1 to 4 carbons.

$R^{22}$ is a direct bond, alkylene of 1 to 14 carbons, oxydialkylene of 4 to 10 carbons, thiodialkylene of 4 to 10 carbons, alkenylene of 2 to 10 carbons, O-, m-, or p-phenylene. Substitutents for $R^{22}$ may be alkyl of 1 to 4 carbons, alkoxy of 1 to 4 carbons, hydroxy, bromine, chlorine, mercapto or alkylmercapto of 1 to 4 carbons.

$R^{23}$ and $R^{24}$ are independently selected from hydrogen, alkyl of 1 to 10 carbons, aryl of 6 to 12 carbons, aralkyl of 7 to 12 carbons, cycloalkyl of 5 to 12 carbons, and $R^{23}$ may also be 2-cyanoethyl or a radical of the formula

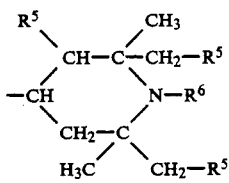

Preferably $R^5$ is hydrogen or methyl, $R^6$ is selected from hydrogen, methyl, acetyl, benzoyl, 2-hydroxyethyl or benzyl, $X^9$ is a direct bond, $-N(R^{20})-C(=O)-R^{21}-Z-$, $-N(R^{20})-C(=O)-R^{22}-C(=O)-Z-$, $-(CH_2)_y-$, or $-R^7-N(R^{23})-$, Z is $-N(R^{23})-$ or $-O-$, $R^7$ is alkylene of 2-10 carbons, $R^{21}$ is alkylene of 1 to 2 carbons, $R^{22}$ is a direct bond or alkylene of 1 to 4 carbons and $R^{23}$ is hydrogen, alkyl of 1-4 carbons or a 2,2,6,6-tetramethyl-4-piperidinyl radical. Most preferably $R^5$ is hydrogen, $R^6$ is hydrogen or methyl, $X^9$ is a direct bond, $-N(R^{20})-C(=O)-R^{21}-Z-$, $-N(R^{20})-C(=O)-R^{22}-C(=O)-Z-$, Z is $-N(R^{23})-$, $R^{21}$ is an ethylene diradical, $R^{22}$ is a direct bond and $R^{23}$ is hydrogen or a 2,2,6,6-tetramethyl-4-piperidinyl radical.

(c) Sulfides of general structures:

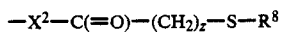

G₃ wherein $R^8$ is aralkyl of 7 to 12 carbons, alkyl of 1 to 18 carbons, or dialkylaminoalkyl of 3 to 12 carbons. z is 1 or 2.

$X^2$ is a divalent radical selected from $-NH-$, $-CH_2-CH_2-O-$, or $-R^7-N(R^{23})-$.

$R^7$ is as previously defined.

Preferably, $R^8$ is an alkyl of 6 to 18 carbons, benzyl, or dimethylaminoethyl, $X^2$ is $-NH-$ or $-R^7-N(R^{23})-$, $R^7$ is alkylene of 1 to 3 carbons, and $R^{23}$ is hydrogen. Most preferably, $R^8$ is an alkyl of 6 to 12 carbons and $X^2$ is $-NH-$.

(d) 2-Hydroxybenzophenones of general structure:

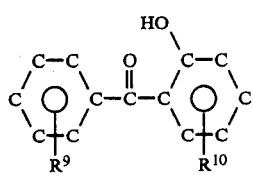

G₄ wherein $R^9$ and $R^{10}$ are independently selected from hydrogen, hydroxyl, alkyl of 1 to 8 carbons, alkoxy of 1 to 4 carbons or a connecting group $X^3$ with the proviso that only one of either $R^9$ or $R^{10}$ can be the connecting group $X^3$.

$X^3$ is a direct bond or a divalent radical selected from $-NH-C(=O)-(CH_2)_b-O-$, $-CH_2-CH_2-O-$, $-NH-C(=O)-$, $-NH-S(=O)_2-$, $-R^7-N(R^{23})-C(=O)-$, or $-R^7-N(R^{23})-S(=O)_2-$ in which $R^7$, $R^{23}$ and b are as previously defined. Additional substituents for the aromatic nucleii include hydroxyl, alkyl of 1 to 8 carbons, and alkoxy of 1 to 4 carbons.

Preferably, $R^9$ is hydrogen, hydroxyl or alkoxy of 1 to 4 carbons, $R^{10}$ is the connecting group $X^3$, $X^3$ is $-NH-C(=O)-(CH_2)_b-O-$ or $-CH_2-CH_2-O-$, and b is 1 or 2. Most preferably, $R^9$ is hydrogen, $R^{10}$ is $X^3$ and $X^3$ is $-NH-C(=O)-(CH_2)_b-O-$, or $-CH_2CH_2O-$ and b is 1 or 2.

(e) 2-(2-hydroxyphenyl)-2H-benzotriazoles of the general structure:

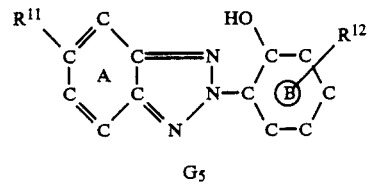

G₅ where:

$R^{11}$ is hydrogen, alkyl of 1 to 4 carbons, alkoxy of 1 to 4 carbons, carboxyl, alkoxycarbonyl of 2 to 11 carbons, carboxylic acid amide, chlorine, bromine, sulfonic acid, alkylsulfonyl, or the connecting group $X^4$.

$R^{12}$ is hydrogen, alkyl of 1 to 8 carbons including t-alkyl of 4 to 8 carbons, aralkyl of 7 to 12 carbons, aryl of 6 to 14 carbons or the connecting group $X^5$.

$X^4$ is a divalent radical selected from $-NH-C(=O)-$, $-NH-S(=O)_2-$, $-R^7-N(R^{23})-S(=O)_2-$, or $-R^7-N(R^{23})-C(=O)-$.

$R^7$ and $R^{23}$ are as previously defined.

$X^5$ is a direct bond or a divalent radical selected from $-NH-C(=O)-(CH_2)_b-C(=O)-N(R^{23})-(CH_2)_y-$, $-NH-C(=O)-(CH_2)_b-N(R^{23})-(CH_2)_y-$, $-(CH_2)_y-$, $-NH-C(=O)-(CH_2)_2-$, $-NH-C(=O)-(CH_2)_z-S-CH_2-C(=O)-N(R^{23})-(CH_2)_y-$, $-NH-C(=O)-(CH_2)_b-O-$, $-NH-C(=O)-$ or $-CH_2-CH_2-O-$, in which $R^{23}$, y, z, and b are as previously defined.

Additional substituents for rings A and B include alkyl of 1-8 carbons, including t-alkyl of 4-8 carbons, alkoxy of 1-8 carbons and halogen (chlorine or bromine). The substitution must be such that one and only one of the substituents ($R^{11}$ or $R^{12}$) is the connecting group.

Preferably $R^{11}$ is hydrogen or chlorine, $R^{12}$ is $X^5$, $X^5$ is $-(CH_2)_y-$, $-NH-C(=O)-(CH_2)_b-O-$, $-CH_2CH_2-O-$, $-NH-C(=O)-(CH_2)_b-C(=O)-NH-(CH_2)_y-$, $-NH-C(=O)-(CH_2)_z-S-CH_2-C(=O)-NH-(CH_2)_y-$, or $-NH-C(=O)-(CH_2)_z-$, y is 1 or 2, b is 1 or 2, and z is 1 or 2. Most preferably, $R^{11}$ is hydrogen, $R^{12}$ is $X^5$, $X^5$ is $-(CH_2)_y-$, $-NH-C(=O)-(CH_2)_b-O-$, or $-NH-C(=O)-(CH_2)_z-$, y is 1, b is 1, and z is 2.

(f) Aromatic amines of general structure:

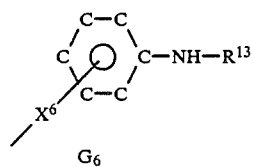

G_6 where $R^{13}$ is aryl of 6 to 14 carbons, alkyl of 1 to 12 carbons or cycloalkyl of 5 to 12 carbons. $X^6$ is a direct bond or a divalent radical selected from —NH—C(=O)—(CH$_2$)$_b$—C(=O)—NH— or —NH—C(=O)—(CH$_2$)$_b$—NH— where b is as previously defined.

Preferably, $R^{13}$ is aryl of 6 to 10 carbons or alkyl of 1 to 12 carbons, $X^6$ is a direct bond or —NH—C(=O)—(CH$_2$)$_b$—C(=O)—NH—, and b is 0, 1, or 2. Most preferably, $R^{13}$ is aryl of 6 to 10 carbons, $X^6$ is a direct bond and the substitution of the connecting group is in the 4 position.

(g) Heterocyclic stabilizers of general structure:

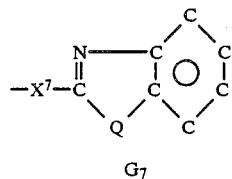

G_7 where Q is as previously defined. $X^7$ is a direct bond or a divalent radical selected from —NH—C(=O)—(CH$_2$)$_z$—Z—, —NH—C(=O)—(CH$_2$)$_b$—C(=O)—NH—, or —NH—C(=O)—(CH$_2$)$_b$—NH—, in which Z, and b are as previously defined.

The aromatic nucleus is optionally substituted with one or more groups selected from hydroxy, alkyl of 1–8 carbons, and alkoxy of 1–8 carbons. Preferably, $X^7$ is a direct bond or —NH—C(=O)—(CH$_2$)$_z$—Z— where Z is —S— or —NH— and z is one or 2. Most preferably, $X^7$ is —NH—C(=O)—(CH$_2$)$_z$—Z— where Z is —S— and z is one.

(h) Salicylic acid derivatives of general structure:

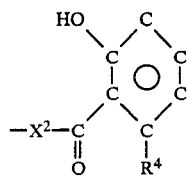

G_8 where $X^2$ is as previously defined. The aromatic nucleus is optionally substituted with one or more groups selected from hydroxy, alkyl or 1–8 carbons and alkoxy of 1–8 carbons.

Preferably, $X^2$ is —NH— or —CH$_2$—CH$_2$—O—.

(i) Salicylate esters of general structure:

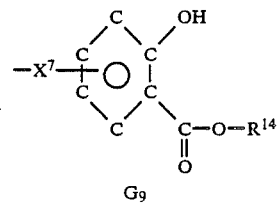

G_9 where
$R^{14}$ is aryl or substituted aryl of 6 to 10 carbons optionally substituted with one or more of alkyl of 1–8 carbons, including t-alkyl of 4–8 carbons, alkoxy of 1–8 carbons, chlorine or bromine.

$X^7$ is as previously defined.

Preferably, $R^{14}$ is aryl or substituted aryl of 6 to 8 carbons, and $X^7$ is —NH—C(=O)—(CH$_2$)$_b$—C(=O)—NH—. Most preferably, $R^{14}$ is phenyl.

(j) Oxamide derivatives of general structure:

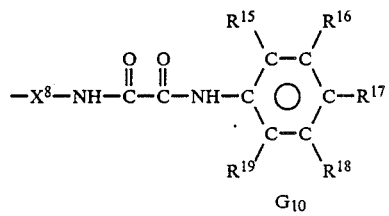

G_10 wherein $R^{15}$, $R^{16}$, $R^{17}$, $R^{18}$, and $R^{19}$ are independently selected from hydrogen, hydroxyl, alkyl of 1 to 8 carbons, aryl of 6 to 12 carbons, aralkyl of 7 to 13 carbons, alkaryl of 7 to 13 carbons, alkoxy or alkylthio of 1 to 12 carbons, acyloxy or acylthio of 2–12 carbons, chlorine, bromine or alkoxycarbonyl of 2 to 8 carbons. $X^8$ is a direct bond, alkylene of 2 to 12 carbons, arylene of 6 to 12 carbons, aralkylene of 7 to 13 carbons, or alkenylene of 2 to 13 carbons.

Preferably, $R^{15}$ is hydroxyl or alkoxy of 1 to 4 carbons, $R^{16}$, $R^{17}$, $R^{18}$, and $R^{19}$ are independently selected from hydrogen or alkyl of 1 to 4 carbons, and $X^8$ is a direct bond. Most preferably, $R^{15}$ is ethoxy, $R^{16}$, $R^{17}$, $R^{18}$, and $R^{19}$ are hydrogen and $X^8$ is a direct bond.

STARTING MATERIALS

The polymer bound stabilizers of this invention are prepared from anhydride polymers or copolymers by reacting stabilizers bearing reactive hydrazido or primary amino functionalities with the anhydride polymers or copolymers. In this reaction, the stabilizers become attached to the polymer or copolymer in the form of a substituted amide group, or a substituted imide group. In one embodiment of this invention, the stabilizer group becomes part of an acylamino group bound to a cyclic imide which is part of the polymer or copolymer.

FUNCTIONALIZED HINDERED PHENOL ANTIOXIDANTS

Examples of hindered phenols which may be reacted with the anhydride polymers or copolymers include the following:

2-(3,5-di-t-butyl-4-hydroxybenzyl)-2-aminopropane,
2,6-di-t-butyl-4-aminophenol,
2,6-di-t-amyl-4-aminophenol,
2,6-di-t-hexyl-4-aminophenol, 2,6-bis(1,1-dimethylpentyl)-4-aminophenol,
2,6-bis(1,1,3,3-tetramethylbutyl)-4-aminophenol,
2-t-butyl-6-t-amyl-4-aminophenol,
2-t-butyl-6-(1,1-dimethylbutyl)-4-aminophenol,
2-t-amyl-6-(1,1-dimethylbutyl)-4-aminophenol,
2-t-butyl-6-(1,1-dimethylpentyl)-4-aminophenol,
2-t-butyl-6-(1,1,3,3-tetramethylbutyl)-4-aminophenol,
2-t-butyl-6-methyl-4-aminophenol,
2-t-amyl-6-methyl-4-aminophenol,
3,5-di-t-butyl-4-hydroxybenzylamine,
3,5-di-t-amyl-4-hydroxybenzylamine,
3,5-di-t-hexyl-4-hydroxybenzylamine,
3-t-butyl-5-methyl-4-hydroxybenzylamine,
2-(3,5-di-t-butyl-4-hydroxyphenyl)ethylamine,
2-(3,5-di-t-amyl-4-hydroxyphenyl)ethylamine,
2-(3-t-butyl-5-methyl-4-hydroxyphenyl)ethylamine,
3-(3,5-di-t-butyl-4-hydroxyphenyl)propylamine,
3-(3,5-di-t-amyl-4-hydroxyphenyl)propylamine,
3-(3-t-butyl-5-methyl-4-hydroxyphenyl)propylamine,
3-(3,5-di-t-butyl-4-hydroxyphenyl)propionhydrazide,
3-(3,5-di-t-amyl-4-hydroxyphenyl)propionhydrazide,
3-(3-t-butyl-5-methyl-4-hydroxyphenyl)propionhydrazide,
3-(3-t-butyl-4-hydroxyphenyl)propionhydrazide,
3-(3,6-di-t-hexyl-4-hydroxyphenyl)propionhydrazide,
3,5-di-t-butyl-4-hydroxybenzhydrazide,
3,5-di-t-amyl-4-hydroxybenzhydrazide,
3-t-butyl-5-methyl-4-hydroxybenzhydrazide,
3-(3,5-di-t-butyl-4-hydroxyphenyl)acrylic acid hydrazide,
4-(3,5-di-t-butyl-4-hydroxyphenyl)semicarbazide,
1-methyl-3-(3,5-di-t-butyl-4-hydroxyphenyl)propionhydrazide,
(3,5-di-t-butyl-4-hydroxyphenyl)acetylhydrazide,
N-(3,5-di-t-butyl-4-hydroxyphenyl)-N'-aminooxamide
2,5-di-t-butyl-4-hydroxyphenylcarbazate
3,5-di-t-butyl-4-hydroxybenzylcarbazate
(3,5-di-t-butyl-4-hydroxyphenylmercapto)acetylhydrazide,
(3-t-butyl-5-methyl-4-hydroxyphenylmercapto)acetylhydrazide,
3-(3,5-di-t-butyl-4-hydroxyphenylmercapto)propionhydrazide,
3-(3-t-butyl-5-methyl-4-hydroxyphenylmercapto)propionhydrazide,
(3,5-di-t-butyl-4-hydroxybenzylmercapto)acetylhydrazide,
(3-t-butyl-5-methyl-4-hydroxybenzylmercapto)acetylhydrazide,
3-(3,5-di-t-butyl-4-hydroxybenzylmercapto)propionhydrazide,
3-(3-t-butyl-5-methyl-4-hydroxybenzylmercapto)propionhydrazide.

FUNCTIONALIZED HINDERED AMINE LIGHT STABILIZERS

Hindered amines which may be reacted with the anhydride polymers or copolymers include the following non-exclusive examples:
4-amino-2,2,6,6-tetramethylpiperidine,
4-amino-1-benzyl-2,2,6,6-tetramethylpiperidine,
4-amino-1,2,2,6,6-pentamethylpiperidine,
4-amino-1-(2-hydroxyethyl)-2,2,6,6-tetramethylpiperidine,
4-amino-1-(2-cyanoethyl)-2,2,6,6-tetramethylpiperidine,
4-amino-1-butyl-2,2,6,6-tetramethylpiperidine,
4-amino-2,6-diethyl-2,3,6-trimethylpiperidine,
4-amino-2,6-diethyl-1,2,3,6-tetramethylpiperidine,
2,2,6,6-tetramethyl-4-piperidinylhydrazine,
1,2,2,6,6-pentamethyl-4-piperidinylhydrazine,
3-(2,2,6,6-tetramethyl-4-piperidinylamino)propionhydrazide,
(2,2,6,6-tetramethyl-4-piperidinylamino)acetylhydrazide,
3-(1,2,2,6,6-pentamethyl-4-piperidinylamino)propionhydrazide.
N-(2,2,6,6-tetramethyl-4-piperidinyl)hydrazinecarboxamide
N-(1,2,2,6,6-pentamethyl-4-piperidinyl)hydrazinecarboxamide
N-(2,2,6,6-tetramethyl-4-piperidinyl)-N'-aminooxamide
N-(2,2,6,6-tetramethyl-4-piperidinyl)-N'-aminosuccinamide
N-(2,2,6,6-tetramethyl-4-piperidinyl)-N'-aminomalonamide
N-(1-acetyl-2,2,6,6-tetramethyl-4-piperidinyl)-N'-aminooxamide
3-(1-acetyl-2,2,6,6-tetramethyl-4-piperidinylamino)propion hydrazide
(2,2,6,6-tetramethyl-4-piperidinyloxy)acetyl hydrazide
(1,2,2,6,6-pentamethyl-4-piperidinyloxy)acetyl hydrazide
3-(2,2,6,6-tetramethyl-4-piperidinyloxy)propion hydrazide
3-(1,2,2,6,6-pentamethyl-4-piperidinyloxy)propion hydrazide
N,N-bis-(2,2,6,6-tetramethyl-4-piperidinyl)-N'-aminooxamide
3-[N,N-bis(2,2,6,6-tetramethyl-4-piperidinyl)amino]propionhydrazide
N-(2,2,6,6-tetramethyl-4-piperidinyl)-N-butyl-N'-aminooxamide

FUNCTIONALIZED SULFIDE ANTIOXIDANTS

Sulfides which may be reacted with the anhydride polymers or copolymers include the following non-exclusive examples:
3-(methymercapto)propionhydrazide,
3-(ethylmercapto)propionhydrazide,
3-(butylmercapto)propionhydrazide,
3-(n-hexylmercapto)propionhydrazide,
3-(n-octylmercapto)propionhydrazide,
3-(decylmercapto)propionhydrazide,
3-(dodecylmercapto)propionhydrazide,
3-(stearylmercapto)propionhydrazide,
3-(benzylmercapto)propionhydrazide,
(methylmercapto)acetylhydrazide,
(ethylmercapto)acetylhydrazide,
(benzylmercapto)acethylhydrazide,
(2-(dimethylamino)ethylmercapto)acetylhydrazide.

FUNCTIONALIZED 2-HYDROXYBENZOPHENONES

2-Hydroxybenzophenones which may be reacted with the anhydride polymers or copolymers include the following non-exclusive examples:
(4-benzoyl-3-hydroxyphenoxy)acetylhydrazide,
4-amino-2-hydroxybenzophenone,
2-hydroxy-4-(2-aminoethoxy)benzophenone,
(4-(2-hydroxybenzoyl)-3-hydroxyphenoxy)acetylhydrazide,
(4-(4-methoxybenzoyl)-3-hydroxyphenoxy)acetylhydrazide,
(4-(4-methoxybenzoyl)-3-hydroxyphenoxy)acetylhydrazide, 4-(4-benzoyl)-3-hydroxyphenoxy)butenoic acid hydrazide,
2-(2',4'-dihydroxybenzoyl)benzoic hydrazide,
2-(2'-hydroxy-4'-methoxybenzoyl)benzoic hydrazide.

FUNCTIONALIZED-2-(2-HYDROXYPHENYL)-2H-BENZOTRIAZOLES 2-(2-Hydroxyphenyl)-2H-benzotriazoles which may be reacted with the anhydride polymers or copolymers include the following non-exclusive examples:
2-(4-amino-2-hydroxyphenyl)-2H-benzotriazole,
2-(4-amino-2-hydroxyphenyl)-5-hydroxy-2H-benzotriazole,
2-(4-amino-2-hydroxyphenyl)-5-chloro-2H-benzotriazole,
2-(2-hydroxy-5-aminomethylphenyl)-2H-benzotriazole,
2-(2-hydroxy-3-aminomethyl-5-methylphenyl)-2H-benzotriazole
3-(3-(2H-benzotriazol-2-yl)-4-hydroxy-5-t-butylphenyl)propionhydrazide,
3-(3-(5-chloro-2H-benzotriazol-2-yl)-4-hydroxy-5-t-butylphenyl)propionhydrazide,
3-(3-(2H-benzotriazol-2-yl)-4-hydroxy-5-methylphenyl)propionhydrazide,
3-(3-(2H-benzotriazol-2-yl)-2,6-dihydroxyphenyl)propionhydrazide,
3-(3-(5-chloro-2H-benzotriazol-2-yl)-4-hydroxy-5-methylphenyl)propionhydrazide,
(4-(2H-benzotriazol-2-yl)-3-hydroxyphenoxy)acetyl hydrazide,
(4-(5-methoxy-2H-benzotriazol-2-yl)-3-hydroxyphenoxy)acetyl hydrazide,
(4-(5-chloro-2H-benzotriazol-2-yl)-3-hydroxyphenoxy)acetyl hydrazide,
3-(2H-benzotriazol-2-yl)-4-hydroxybenzoic acid hydrazide.

FUNCTIONALIZED AROMATIC AMINES STABILIZERS

Secondary aromatic amines which may be reacted with the anhydride polymers or copolymers include the following non-exclusive examples:
p-aminodiphenylamine,
N-isopropyl-p-phenylenediamine,
N-hexyl-p-phenylenediamine,
N-cyclohexyl-p-phenylenediamine,
p-amino-4'-methyl-diphenylamine,
p-amino-4'-ethoxy-diphenylamine,
p-amino-4'-methoxy-diphenylamine,
p-amino-4'-(N,N-dimethylamino)-diphenylamine.

FUNCTIONALIZED HETEROCYCLIC STABILIZERS

Benzothiazoles and benzimidazoles which may be reacted with anhydride polymers or copolymers include the following non-exclusive examples:
(benzothiazol-2-yl-mercapto)acetylhydrazide,
(benzimidazol-2-yl-mercapto)acetylhydrazide.

FUNCTIONALIZED SALICYLIC ACID AND ARYL SALICYLATE STABILIZERS

Salicylic acid derivatives which may be reacted with anhydride polymers or copolymers include the following non-exclusive examples:
salicylic hydrazide
phenyl 4-aminosalicylate,
N-(3-hydroxy-4-(phenoxycarbonyl)phenyl)-N'-aminooxamide.

FUNCTIONALIZED OXAMIDE STABILIZERS

Oxamide derivatives which may be reacted with the anhydride polymers or copolymers include the following non-exclusive examples:
N-(2,4,6-trichlorophenyl)-N'-aminooxamide,
N-(2,4,6-tribromophenyl)-N'-aminooxamide,
N-(2-ethoxyphenyl)-N'-aminooxamide,
N-(2-methoxyphenyl)-N'-aminooxamide,
N-(2-ethylphenyl)-N'-aminooxamide,
N-(2-methylphenyl)-N'-aminooxamide,
N-(4-methoxycarbonylphenyl)-N'-aminooxamide,
N-(2-methoxycarbonylphenyl)-N'-aminooxamide,
N-(4-chlorophenyl)-N'-aminooxamide,
N-(4-bromophenyl)-N'-aminooxamide,
N-(4-methoxyphenyl)-N'-aminooxamide,
N-(2-octyloxyphenyl)-N'-aminooxamide.
N-(2-ethoxy-5-t-butylphenyl)-N'-aminooxamide,
N-(2-methoxy-3,5-di-t-butyl-6-methylphenyl)-N'-aminooxamide,
N-(2-methoxy-3,5-di-t-butylphenyl)-N'-aminooxamide,
N-(2-methoxy-3-t-butyl-5-methyl)-N'-aminooxamide,
N-(2-ethoxyphenyl)-N'-(4-aminophenyl)oxamide,
N-(2-ethylphenyl)-N'-(3-aminophenyl)oxamide,
N-(2-ethoxyphenyl)-N'-(6-aminohexyl)oxamide,
N-(2-methoxyphenyl)-N'-(2-aminoethyl)oxamide, and
N-(2-methoxy-5-t-butylphenyl)-N'-aminooxamide.

ANHYDRIDE CONTAINING POLYMERS AND COPOLYMERS

In general, any polymer or copolymer containing cyclic anhydride groups, either in the polymer backbone, on grafted side chains, or as pendant units is suitable for attachment of the reactive stabilizers to form the multipurpose polymer bound stabilizers of this invention. Due to cost and ease of preparation, the anhydride containing polymers are preferably polymers or copolymers of maleic anhydride.

The polymer bound multipurpose stabilizers of this invention are prepared by reacting stabilizers bearing reactive hydrazido or primary amino funtionalities with these anhydride polymers or copolymers.

To illustrate the broad nature of this invention, several types of anhydride containing copolymers will be described. Suitable anhydride containing copolymers useful for employment in this invention include the following: (a) styrene-maleic anhydride copolymers, (b) alternating copolymers of maleic anhydride and alpha-olefins, (c) copolymers of alkyl vinyl ethers and maleic anhydride, (d) maleic anhydride modified polyolefins, (e) maleic anhydride adducts of hydrogenated polymers or copolymers, (f) maleic anhydride adducts of EPDM; and other anhydride copolymers.

(a) Styrene-maleic anhydride copolymers

The styrene-maleic anhydride copolymers employed in this invention are a general class of compounds consisting of the alternating copolymers of styrene and maleic anhydride, or the non-equimolar copolymers containing less than about 50 mole percent of the anhydride monomer. The styrene may be replaced in whole or in part by other vinylaromatic monomers such as alpha-methylstyrene, nuclear methylstrenes, ethylstyrene, isopropylstyrene, t-butylstyrene, chlorostyrenes, dichlorostyrenes, bromostyrenes, dibromostyrenes, vinylnaphthalene and the like. Similarly, the maleic anhydride can be replaced in whole or in part by another alpha, beta - unsaturated cyclic dicarboxylic acid anhydride such as itaconic, aconitic, citraconic, mesaconic, chloromaleic, bromomaleic, dichloromaleic, dibromomaleic, phenylmaleic and the like. The preferred alpha, beta - unsaturated cyclic anhydride is maleic anhydride. The copolymer may also contain a termonomer such as a 1-3 carbons alkyl acrylate or methacrylate, acrylonitrile, methacrylonitrile, acrylamide, methacrylamide, acrylic acid or methacrylic acid.

Suitable copolymers may be prepared by any of the several methods available for the preparation of styrene-maleic anhydride copolymers or they may be purchased commercially. Non-equimolar copolymers may be prepared by solution polymerization directly from the respective monomers by the incremental addition of the reactive monomer as taught by U.S. Pat. No. 2,971,939, by a continuous recycle polymerization process described in U.S. Pat. No. 3,509,110, or by numerous known variations.

Also, suitable are the rubber-modified copolymers where 5 to 40 percent by weight of one of the known elastomers has been incorporated into the vinylaromatic-alpha, beta - unsaturated dicarboxylic acid anhydride copolymer. The elastomers may be incorporated into the anhydride copolymers by blending, mixing or copolymerizing the monomers in the presence of the rubber.

Suitable rubbers, or elastomers, include conjugated 1,3-diene rubbers, styrene-diene copolymer rubbers, acrylonitrile-diene copolymer rubbers, ethylene-propylene copolymer rubbers, ethylene-propylene-diene terpolymer rubbers, acrylate-diene copolymer rubbers, and mixtures thereof.

Preferred rubbers are diene rubbers such as homopolymers of conjugated dienes such as butadiene, isoprene, chloroprene, and piperylene and copolymers of such dienes with up to 50 mole percent of one or more copolymerizable mono-ethylenically unsaturated monomers, such as styrene, substituted styrenes, acrylonitrile, methacrylonitrile and isobutylene.

Preferably, the elastomers are incorporated into the monomer mixture prior to polymerization using, for example, the method of U.S. Pat. No. 4,097,551 or U.S. Pat. No. 4,486,570 in which a mixture of at least two rubbery additives are present during the polymerization.

Particularly suitable for use are the non-equimolar copolymers of styrene and maleic anhydride designated Dylark TM copolymers, commercially available from ARCO Chemical Company. Suitable Dylark copolymers include those of the 200 series and the 300 series and Dylark TM 600 and 700 copolymer. Those copolymers designated Dylark TM 250, Dylark TM 350 and Dylark TM 700 are impact modified and are especially useful.

The SMA TM resins are low molecular weight styrene-maleic anhydride copolymers (MW 700-1900) and are also useful in this invention. The low molecular weight SMA resins SMA TM 1000, 2000 and 3000 available from ARCO are also useful in this invention.

Also suitable are the styrene-maleic anhydride copolymers or rubber modified styrene-maleic anhydride copolymers where a portion of the maleic anhydride groups are converted to maleimide groups or N-substituted maleimide groups. The partially imidated copolymers can be prepared by treating the SMA polymer with a primary amine in a post polymerization step as described in U.S. Pat. No. 3,998,907 or during the polymerization as described in U.S. Pat. No. 4,381,373. The molar ratio of the amine to the maleic anhydride in the copolymer should be less than 0.8 to allow attachment of the stabilizer groups. The formation of the maleimide groups that don't contain stabilizer groups may be formed before, during or after the formation of the maleimide groups containing stabilizer groups. Suitable amines for this purpose are ammonia, primary alkyl amines and primary aryl amines. Long chain primary alkyl amines will beneficially aid in flow properties of the system while primary aryl amines will increase the thermal stability and heat distortion properties of the system. Aniline is the preferred aromatic amine for increasing the thermal stability of the polymer system. Brominated or chlorinated primary amines will increase the fire retardancy of the system.

The SMA copolymer may optionally contain a termonomer such as a 1-3 carbons alkyl acrylate or methacrylate, acrylonitrile, methacrylonitrile, acrylamide, methacrylamide, acrylic acid or methacrylic acid. Rubber modified terpolymers of styrene, maleic anhydride and alkyl (1-3 carbons) methacrylates are described in U.S. Pat. No. 4,341,695. Incorporation of the methacrylate comonomer at specific levels (2 to 20% by weight) increases the heat distortion temperature of the polymer, raises the tensile strength, and increases the gloss of the rubber-modified polymer. The polymeric composition is conveniently prepared by dissolving the rubber in a solution of the monoalkenyl aromatic component and the methacrylate ester in a suitable solvent and then polymerizing the solution with the anhydride component in the manner described in, for example, U.S. Pat. Nos. 2,971,939, 3,336,267 and 3,919,354.

The Cadon TM resins (Monsanto Chemical Company) are a commercial series of styrene-maleic anhydride polymer alloys with ABS. Rubber-modified versions are also available. These resins are also suitable fo this invention.

Also suitable are the rubber modified styrene-maleic anhydride resins described in the U.S. Pat. No. 4,522,983 where a minor amount of a nuclear substituted methylstryene is included in the composition to increase the impact strength of the composition.

The stryene-maleic anhydride polymers may be further modified by copolymerizing the monomers in the presence of other monomers. In addition to the acrylates, methacrylates, acrylonitrile and methacrylonitrile previously mentioned, other suitable monomers include the ethlenically unsaturated carboxylic acids, preferably acrylic and methacrylic acids, acrylamide and methacrylamide, dialkylamino alkyl (3-6 carbons) acrylates or methacrylates such as dimethylaminoethyl acrylate or methacrylate, and vinyl esters derived from saturated carboxylic acids of 2 to 22 carbons such as vinyl acetate or vinyl propionate.

Further modification of the styrene-maleic anhydride copolymers can be accomplished by carrying out the copolymerization in the presence of crosslinking monomers having two or more ethylenically unsaturated double bonds such as divinylbenzene, 1,4-butadiene, divinyl ether, ethylene glycol dimethacrylate, butanediol dimethacrylate, triallyl cyanurate and similar type compounds. The crosslinking monomers are employed in amounts of from 0.01 to 5, preferable from 0.1 to 2 mole percent based on maleic anhydride.

(b) Alternating copolymers of maleic anhydride and alpha-olefins

Alternating copolymers of maleic anhydride and alpha-olefins are exemplified by U.S. Pat. Nos. 3,553,177, 3,560,455, 3,560,456 and 3,560,457. Each of these patents describes a copolymer of maleic anhydride with a specific alpha-olefin such as 12-30 carbons alpha-olefins.

The copolymers of 6-10 carbons alpha-olefins are known as shown by U.S. Pat. No. 3,488,311. Terpolymers of maleic anhydride and at least one lower alpha-olefin and at least one higher alpha-olefin are also known, as shown by Canadian Patent No. 1,180,497. PA-18 is an example of a commercially available alternating copolymer of maleic anhydride and octadecene-1 (product of Chevron Chemical Company).

Also suitable for this invention are terpolymers disclosed in U.S. Pat. Nos. 4,522,992 and 3,723,375. These are terpolymers of cyclic alpha, beta - unsaturated dicarboxylic acid anhydrides, aromatic mono-alkenyl monomers and higher 1-alkenes. Preferably, they are terpolymers of styrene, maleic andydride and alpha-olefins having 10 or more carbon atoms. Both pure alkenes and mixed alkenes can be utilized in preparing the terpolymers.

(c) Copolymers of alkyl vinyl ethers and maleic Anhydride

Alternating copolymers of alkyl vinyl ethers and maleic anhydride are readily prepared in bulk or solution using free radical initiators (e.g., lauroyl peroxide). Low, medium and high molecular weight grades are commercially available. Commercial grades include the Gantrez TM resins (General Aniline and Film). Suitable alkyl vinyl ethers for copolymerization include methyl, ethyl, propyl, isopropyl, n-butyl, isobutyl, amyl, isoamyl, hexyl, heptyl, octyl, 2-ethylhexyl, nonyl, decyl, dodecyl, hexadecyl and octadecyl vinyl ethers.

(d) Maleic anhydride modified Polyolefins

The maleic anhydride modified polyolefins which can be employed in this invention have the general formula:

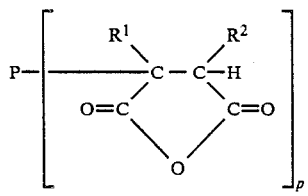

where P- represents an olefin polymer residue which is based on a preponderance of ethylene, propylene or 1-butene, and having a valence of p. It can be either a high or low density polyethylene residue, a polypropylene residue or a residue of a copolymer of ethylene with 1-butene, a residue of a copolymer of ethylene and propylene, a residue of a propylene-butene copolymer or a residue of such a propylene copolymer with an olefin having up to about six carbon atoms.

The maleic anhydride-modified polyolefins are materials containing about 0.2 to 9% by weight of combined maleic anhydride, preferably about 2 to 5%. In fact, one embodiment of these materials is a commercially available product, sold under the trademark "Hercoprime TM " by Hercules Incorporated. Polyethylene or polypropylene modified with maleic anhydride is available commercially from Enron Chemical Co. under the trademark "Plexar TM ". Any polymer or copolymer of ethylene, propylene, or 1-butene can be modified via the maleic anhydride moiety to form the substrate molecule, including polyethylene, polypropylene, ethylene-propylene copolymer, propylene-butene-1 copolymer, or butene-1-ethylene copolymer. The most frequently encountered and the preferred maleic anhydride modified polyolefin is that based on polypropylene.

The preparation of maleic anhydride modified polypropylene comprises exposing the olefin polymer to material or condition which will induce the formation of active, free radical sites thereon with which maleic anhydride can react. Active centers can be induced, e.g., by subjecting the polymer to the action of high energy ionizing radiation such as gamma rays, X-rays, or high speed electrons, by contacting it, either as a solid or a solution in a solvent, with a free radical producing material such as dibenzoyl peroxide, dilauroyl peroxide, dicumyl peroxide or t-butyl perbenzoate, or by simply milling it in the presence of air. The preferred method is the reaction of the polyolefin with maleic anhydride in solvent solution in the presence of a free radical initiator.

The olefin polymer based maleimides of the invention are prepared by graft modifying the appropriate polymer backbone with a maleic anhydride and thereafter reacting said anhydride modified olefin polymer with stabilizers containing primary amino or hydrazido functionalities. A less preferred method is to modify the appropriate polymer backbone with N-(stabilizer substituted)maleimides of formula:

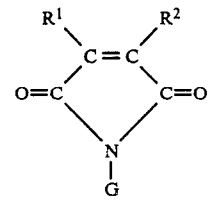

where $R^1$, $R^2$ and G are as previously defined and more than one class of G groups are present.

The graft modification of EPDM by maleic anhydride in the presence of dicumyl peroxide and benzoyl peroxide is described by DeVito and co-workers (G. DeVito, N. Lanzetta, G. Maglio, M. Malinconico, P. Musta, R. Palumbo, J. Polym, Sci., Polyn, Chem, Ed., 22, pp 1335-1347 (1984)).

(e) Maleic anhydride adducts of hydrogenated polymers or copolymers

The maleic anhydride adduct polymers useful in this invention are polymeric products containing pendant succinic anhydride groups which are formed by reacting maleic anhydride with hydrogenated polymers of conjugated dienes or hydrogenated copolymers of conjugated dienes and vinyl aromatic hydrocarbons containing a residual unsaturation level of from 0.5 to 20 percent of their original unsaturation level prior to hydrogenation. The reaction which is conducted by heating a mixture of the maleic anhydride and hydrogenated polymer or copolymer containing residual unsaturation proceeds by means of a reaction mechanism referred to as an "ENE" type Reaction. The maleic anhydride adds to the unsaturation of the polymer to form the polymer product containing the pendant succinic anhydride groups. This polymer by virtue of the pendant anhydride groups can be reacted with stabilizers containing primary amino or hydrazide groups to form the polymer bound stabilizers of this invention.

The amounts of maleic anhydride employed in the reaction can vary considerably depending on the specific nature of the hydrogenated polymer and the properties desired in the final product. In general, the amount of maleic anhydride employed may range from 0.1 to about 25 percent by weight based on total weight of maleic anhydride and hydrogenated polymer with a preferred amount being from 0.2 to 5 percent by weight.

Various polymers of conjugated dienes and copolymers of conjugated dienes and vinyl aromatic hydrocarbons may be hydrogenated for use in preparing the maleic anhydride adduct component of the compositions of the invention. Polymers of conjugated dienes which may be hydrogenated include polymers derived from one or more conjugated diene monomers. Thus, polymers derived from a single conjugated diene such as 1,3-butadiene (i.e., a homopolymer) or polymers derived from two or more conjugated dienes such as, for example, 1,3-butadiene and isoprene or 1,3-butadiene and 1,3-pentadiene (i.e., a copolymer) and the like may be utilized. Copolymers which may be hydrogenated include random copolymers of conjugated dienes and vinyl aromatic hydrocarbons and block copolymers of conjugated dienes and vinyl aromatic hydrocarbons which exhibit elastomeric properties.

(f) Maleic anhydride adducts of EPDM

The maleic anhydride adducts of EPDM are also suitable maleic anhydride polymers for attachment of reactive stabilizer groups. They are prepared by the thermal addition of maleic anhydride to elastomeric copolymers of ethylene and propylene which have a substancially saturated hydrocarbon backbone chain and unsaturated hydrocarbon side-chains. The preparation of these adducts is described in U.S. Pat. No. 3,884,882.

(g) Other anhydride copolymers

Examples of other anhydride copolymers that are suitable for use in this invention for attaching multiple stabilizer groups to polymer backbones via imide formation include the following non-limiting list:

(1) vinyl acetate-maleic anhydride copolymer
(2) ethylene-vinyl acetate-maleic anhydride terpolymer
(3) isobutylene-maleic anhydride copolymer
(4) graft polyols containing styrene-maleic anhydride copolymer in the grafted chain
(5) styrene-maleic anhydride-2,4,6-tribromophenyl acrylate terpolymer
(6) maleic anhydride-divinylbenzene-styrene terpolymer
(7) ethylene-maleic anhydride-styrene graft copolymer
(8) methyl methacrylate-maleic anhydride copolymers
(9) butyl methacrylate-maleic anhydride-styrene copolymer
(10) ethylene-maleic anhydride copolymers (Monsanto)

Other suitable maleic anhydride copolymers include the terpolymers of anhydrides, aromatic mono-alkenyl monomers and higher 1-alkenes described in U.S. Pat. No. 4,522,992, the tribromophenyl acrylate-epichlorohydrin-maleic anhydride-styrene copolymer described in U.S. Pat. No. 4,108,943, and the methyl methacrylate-maleic anhydride-styrene copolymers disclosed in Japanese Patent Nos. 59/221,314 and 59/221,315 (CA102: 15031x and 150318y), divinyl ether-maleic anhydride copolymers from Adica Labs (Pivan), a polybutadiene-polystyrene-maleic anhydride terpolymer referred to as Ricon TM 184/MA, a product of Colorado Chemical Specialties, Inc., and ethylene/vinyl acetate copolymer grafted with maleic anhydride such as Modic E 310K a product of Mitsubishi Chemical Industries Co.

In addition poly(maleic anhydride) such as Belcene, a product of Ciba-Geigy, is also suitable in this invention.

Anhydride polymers containing glutaric anhydride units can also be used in this invention. Such polymeric anhydrides are available from polymers and copolymers of acrylic and methacrylic acid by heating under dehydrating conditions, with or without a catalyst (European Patent No. 76,691).

SYNTHESIS

The multipurpose polymer bound stabilizers can be prepared in step-wise fashion by adding first one reactive stabilizer to the anhydride polymer or copolymer under reactive conditions and then adding a second reactive stabilizer of a different general structure provided that the equivalents of the first reactive stabilizer do not exceed the equivalents of anhydride in the polymer or copolymer. Likewise, a third reactive stabilizer can be added if there is still anhydride functionality left to react. Additional reactive stabilizers can be attached to the polymers or copolymers by properly adjusting the stoichiometry of the reactive stabilizers and the anhydride polymers or copolymers. It has been found that the least reactive stabilizers can be advantageously added first and the more reactive ones later in the preparation. Alternately, the stabilizers can be blended together and added to the anhydride polymer or copolymer under reactive conditions.

The reaction of the reactive stabilizers with anhydride polymers or copolymers may be carried out in inert solvents such as benzene, toluene, xylene, mesitylene, chlorobenzene, dimethylformamide, tetrahydrofuran and aliphatic hydrocarbons. Ketone solvents should be avoided when any of the reactive stabilizers contain hydrazide funtionalities.

Preferably, the reactive stabilizers are attached to the anhydride polymers or copolymers by a melt blending step in the absence of a solvent. This can be accomplished at a temperature above the softening point of the anhydride polymer or copolymer using any conventional melt mixing apparatus such as a plastograph, Banbury mixer, two roll mill, single or twin screw extruder or any other method which applies sufficient heat (e.g., 175° to 275° C.) and shear to the ingredients to obtain a satisfactory blend. Preferably, the reaction should be carried out in an inert atmosphere such as nitrogen.

The reaction is to be carried out for times varying from 30 seconds to 48 hours depending upon the desired degree of conversion of the anhydride, the reactivity of the reactive stabilizer, the reaction temperature and the presence or absence of a solvent or catalyst. The temperature range includes from 20° C. to the decomposition temperature of either starting material. For many polymers this decomposition temperature is between 230° and 260° C. However, for engineering thermoplastics such as poly(phenylene oxide) or polycarbonate, decomposition temperatures easily exceed 300° C. At lower reaction temperatures, the reactive stabilizers used for the invention become attached to the polymers as amic acid derivatives. For solution reactions, temperatures are conveniently controlled by judicious choice of solvents within an appropriate boiling range. Temperatures in this case range from 20° C. to approximately 225° C., preferably from 75° C. to 200° C. and most preferably from 110° C. to 200° C. Reaction times for solvent reaction range from several minutes to 40 hours. Higher reaction temperatures will reduce time for conversion to the desired product(s). Preferably solvent reaction times will be between 15 minutes and 8 hours and most preferably between 15 minutes and 4 hours. In addition, azeotropic water removal from the solvent will facilitate most solvent reactions.

Appropriate temperatures for melt processing the reactive components can range from 20° C. to greater than 300° C. in the case for engineering thermoplastics. Generally, the preferred range is from the softening temperature of the starting polymer to about 300° C. Most preferably, the temperature range will be from 150° C. to 300° C. The time required at the higher temperatures of melt processing are preferably from 30 seconds to 8 hours and most preferably from 30 seconds to about 1 hour.

As reaction temperatures are increased, as in the case of engineering thermoplastics, the amic acids initially formed tend to cyclize to imides. Imide formation in most cases is assured by temperatures exceeding 225° C.

In addition, the multipurpose polymer bound stabilizers can be prepared in the presence of inert polymers such as HIPS, ABS, SAN, MBS, ASA. polystyrene, polyolefins, various copolymers of polystyrene and rubbery materials, PPO, PPE and various combination thereof. These stabilized polymer alloys or blends can be prepared in solution or in a melt blending step in any conventional melt mixing apparatus such as a Banbury mixer or an extruder. In addition, once the stabilizers are attached to the anhydride polymers or copolymers, the modified anhydride polymer or copolymer (or modified anhydride polymer or copolymer blend) may be blended with polymers or copolymers containing reactive carbonyl groups such as nylon, polycarbonate, polyesters and polyarylates.

It is within the scope of this invention that the anhydride polymers or copolymers may be partially imidized with ammonia, primary alkyl or aromatic amines and the residual anhydride groups either totally or partially reacted with the reactive stabilizers to form maleimide groups. Likewise the anhydride polymers or copolymers may be reacted with the reactive stabilizer groups first and then the residual anhydride groups either totally or partially reacted with ammonia, primary alkyl or aromatic amines or the anhydride copolymers may be reacted simultaneously with the reactive stabilizers and the primary amines. A particularly preferred embodiment is to partially imidize the anhydride copolymer with a $C_8$ to $C_{200}$ primary alkyl amine or mono amine-terminated poly(oxyalkylene). Small amounts of mono-amine-terminated Jeffamines (primary amine terminated block copolymers of ethylene oxide and propylene oxide, poducts of Texaco Chemical Company) will contribute advantageous mold release properties to the polymers or copolymers. These $C_8$ to $C_{200}$ alkyl or poly(oxyalkylene) substituents will also lower the Tg of the modified copolymers, increase their compatibility with other polymeric compositions such as polyolefins, lower processing temperatures, increase melt flow and may also contribute to lubricating properties.

Residual carboxyl or anhydride groups may be reacted with aqueous bases or metallic oxides to form ammonium or metal salts along the polymer. Care must be taken to avoid saponification of the stabilizer groups.

It is also within the scope of this invention that the anhydride polymers or copolymers may be partially imidized with other functionalized amines or hydrazides which will add additional properties to the polymers or copolymers. For example, attachment of trialkoxysilyalkylamines such as aminomethyltrimethoxysilane, 3-aminopropyltriethoxysilane or 3-aminopropyltri(n-propyloxy)silane (see U.S. Pat. No. 3,755,354) will enhance the ability of the polymer or copolymer system to accept fillers. Likewise, reaction of chlorinated or brominated primary amines or hydrazides will contribute flame retardant properties to the polymers or copolymers. Antistatic properties can be introduced in a similar manner. For example the anhydride copolymers may be partially reacted with 3-dimethylamino- propylamine to form the 3-dimethylaminopropylimide and then in a subsequent step the dimethylaminopropyl group may be quarternized with an alkyl halide such as methyl iodide (see U.S. Pat. No. 3,555,001).

When the attachments are run in solution, the products can be isolated by removal of the solvent or by precipitation of the product in a non-solvent such as methanol or hexane. In the latter case, the product is separated from the solvent, washed with fresh non-solvent and dried in an oven at elevated temperature, preferably under vacuum or an inert atmosphere.

When the attachments are carried out in a mixer in the molten state, the blended product is cooled, ground up in a grinder or pelletized and dried in an oven at elevated temperatures, preferably under vacuum or an inert atmosphere. When the reaction is carried out in an extruder, the extrudate is cooled, either by an inert gas or by a cooling bath, dried if necessary, pelletized or ground up and, if necessary, redried in an oven.

Although not a requirement of this invention, it is generally beneficial to attach stabilizing groups to the anhydride polymers or copolymers which will provide synergistic stabilizing effects. This would reduce the concentration requirements of the multipurpose polymer bound additives thereby providing economic benefits.

The multipurpose polymer bound stabilizers of this invention are useful as thermal and/or light stabilizers for synthetic polymers which are normally subject to thermal, oxidative or actinic light degradation. Depending upon the various classes of G groups attached to the copolymers, the compounds may act solely as antioxidants, solely as light stabilizers or preferably as both. Preferably the combination of two or more classes of G groups on the polymer will form a synergistic system as for example by attaching compounds of class $G_2$ and compounds of class $G_4$ or $G_5$ to the same anhydride copolymer.

Since the stabilizer groups are bound to polymers they will not be lost from the polymer system by volatilization, migration or extraction even at high temperatures. This makes these stabilized polymers especially attractive in food grade applications.

The multipurpose polymer bound stabilizers of this invention can be used by themselves as stabilized compositions or they may be blended with other polymers to form stabilized blends. When blending with other polymers, it is advantageous to try to match the polymer backbone of the anhydride containing copolymer with the polymer or copolymer to be stabilized. For example, better results are obtained when stabilizing polypropylene, if the stabilizer (G) groups are attached to an octadecene-maleic anhydride copolymer rather than a styrene-maleic anhydride copolymer. Likewise, the styrene-maleic anhydride conpolymers are more suitable for attachment of the G groups when stabilizing styrenics.

Concentrates of the novel multipurpose polymer bound stabilizers in other polymers can be used as masterbatches to stabilize other polymer systems. For example, masterbatches of modified Dylark ™ resins in polystyrene may be blended with poly(phenylene oxide)-polystyrene blends to stabilize them against thermal and/or photochemical degradation. The amount of concentrate required will depend on the stabilizer groups attached, their concentration in the concentrate, additional additives present, the particular polymer system to be stabilized and the degree of stabilization desired. Optimization of these variables can be easily accomplished by those skilled in the art.

In general it is advisable to have about 0.01 to 5% by weight of the active stabilizer group (i.e., the G group) in the final polymer or copolymer blend. An advantageous range is from about 0.05 to about 2% by weight and especially from about 0.1 to about 1% by weight of each active stabilizer group.

The multipurpose polymer bound stabilizers of this invention can be used together with other additives to further enhance the properties of the finished polymer. It is advantageous if the supplementary additives act as synergists with one or more of the polymer bound stabilizer groups. Some synergistic systems applicable to this invention would include the following non-exclusive examples:

(1) hindered amines and 2-(2-hydroxyphenyl)-2H-benzotriazoles
(2) hindered amines and 2-hydroxybenzophenones
(3) hindered phenols and sulfides
(4) hindered phenols and aromatic secondary amines
(5) hindered phenols and 2-hydroxybenzophenones
(6) alkylmercaptopropionyl hydrazine derivatives and hindered amines (U.S. Pat. No. 4,469,828), and
(7) hindered amines and hindered phenols.

In addition hindered phenols, hindered amines, 2-hydroxybenzophenones, 2-(2-hydroxyphenyl)-2H-benzotriazoles, and phenyl salicylates all would provide synergistic effects with added phosphite stabilizers. Examples of other additives that can be used in conjunction with the stabilizers of this invention include other antioxidants such as alkylated monophenols, alkylated hydroquinones, hydroxylated thiodiphenyl ethers alkylidiene-bis-phenols, hindered phenolic benzyl compounds, acylaminophenols, esters of 3-(3,5-di-t-butyl-4-hydroxyphenyl)propionic acid, 3-(5-t-butyl-4-hydroxy-3-methylphenyl)propionic acid, 3-(3,5-di-t-butyl-4-hydroxy-phenyl)propionic acid amides; other UV absorbers and light stabilizers such as 2-(2'-hydroxyphenyl)-2H-benzotriazoles, 2-hydroxybenzophenones, benzylidene malonate esters, esters of substituted or unsubstituted benzoic acids, diphenyl acrylates, nickel chelates, oxalic acid diamides, other hindered amine light stabilizers; other additives such as metal deactivators, phosphites and phosphonites, peroxide decomposers, fillers and reinforcing agents, plasticizers, lubricants, corrosion and rust inhibitors, emulsifiers, mold release agents, pigments, carbon black, fluorescent brighteners, both organic and inorganic flame retardants and non-dripping agents, melt flow improvers and antistatic agents. Numerous examples of suitable additives of the above type are given in Canadian Patent No. 1,190,038.

If higher levels of a stabilizer are attached to the anhydride polymer of copolymer, the modified polymer or copolymer may be used as a stabilizer concentrate and may be blended with the anhydride polymer or copolymer or with other polymers or copolymers. Examples of such polymers and copolymers which may be stabilized by these stabilizer concentrates include:

1. Polyolefins such as high, low and linear low density polyethylenes, which may be optionally crosslinked, polypropylene, polyisobutylene, poly(methylbutene-1), polyacetylene and in general polyolefins derived from monomers having from two to about ten carbons and mixtures thereof.
2. Polyolefins derived from diolefins such as polybutadiene and polyisoprene.
3. Copolymers of mono or diolefins such as ethylene-propylene, propylene-butene-1, propylene-isobutylene and ethylene-butene-1 copolymer.
4. Terpolymers of ethylene and propylene with dienes (EPDM) such as butadiene, hexadiene, dicyclopentadiene and ethylidene norbornene.
5. Copolymers of alpha-olefins with acrylic acid or methacrylic acids or their derivatives such as ethylene-acrylic acid, ethylene-methacrylic acid and ethylene-ethyl acrylate copolymers.
6. Styrenic polymers such as polystyrene (PS) and poly(p-methylstyrene).
7. Styrenic copolymers and terpolymers such as styrene-butadiene (SBR), styrene-allyl alcohol and styrene-acrylonitrile (SAN), styrene-acrylonitrile-methacrylate terpolymer, styrene-butadiene-styrene block copolymers (SBS), rubber modified styrenics such as styrene-acrylonitrile copolymers modified with acrylic ester polymer (ASA), graft copolymers of styrene on rubbers such as polybutadiene (HIPS), polyisoprene or styrene-butadiene-styrene block copolymers (Stereon ™ products of Firestone Synthetic Rubber and Latex Co.), graft copolymers of styrene-acrylonitrile on rubbers such as butadiene (ABS), polyisoprene or styrene-butadiene-styrene block copolymers, graft copolymers of styrene-methyl methacrylate on rubbers such as polybutadiene (MBS), butadiene-styrene radial block copolymers (e.g., KRO 3 of Phillips Petroleum Co.), selectively hydrogenated butadiene-styrene block copolymers (e.g., Kraton G from Shell Chemical Co.) and mixtures thereof.
8. Polymers and copolymers derived from halogen-containing vinyl monomers such as poly(vinyl chloride), poly(vinyl fluoride), poly(vinylidene chloride), poly(vinlidene fluoride), poly(tetrafluoroethylene) (PTFE), vinyl chloride-vinyl acetate copolymers, vinylidene chloride-vinyl acetate copolymers and ethylene-tetrafluoroethylene copolymers.
9. Halogenated rubbers such as chlorinated and/or brominated butyl rubbers of polyolefins and fluoroelastomers.
10. Polymers and copolymers derived from alpha, beta-unsaturated acids, anhydrides, esters, amides and nitriles or combinations thereof such as polymers or copolymers of acrylic and methacrylic acids, alkyl and/or glycidyl acrylates and methacrylates, acrylamide and methacrylamide, acrylonitrile, maleic anhydride, maleimide, the copolymers of the above polymers and various blends and mixtures thereof as well as rubber modified versions of the above polymers and copolymers.
11. Polymers and copolymers derived from unsaturated alcohols or their acylated derivatives such as poly(vinyl alcohol), poly(vinyl acetate), poly(vinyl stearate), poly(vinyl benzoate), poly(vinyl maleate), poly(vinyl butyral), poly(allyl phthalate), poly(allyl diethylene glycol carbonate) (ADC), ethylene-vinyl acetate copolymer and ethylene-vinyl alcohol copolymers.

12. Polymers and copolymers derived from unsaturated amines such as poly(allyl melamine).
13. Polymers and copolymers derived from epoxides such as polyethylene oxide, polypropylene oxide and copolymers thereof as well as polymers derived from bis-glycidyl ethers.
14. Poly(phenylene oxides), poly(phenylene ethers) and modifications thereof containing grafted polystyrene or rubbers as well as their various blends with polystyrene, rubber modified polystyrenes or nylon.
15. Polycarbonates and especially the aromatic polycarbonates such as those derived from phosgene and bisphenols such as bisphenol-A, tetrabromobisphenol-A and tetramethylbisphenol-A.
16. Polyester derived from dicarboxylic acids and diols and/or hydroxycarboxylic acids or their corresponding lactones such as polyalkylene phthalates (e.g., polyethylene terephthalate (PET), polybutylene terephthalate (PBT), and poly(1,4-dimethylcyclohexane terephthalate) or copolymers thereof) and polylactones such as polycaprolactone.
17. Polyarylates derived from bisphenols (e.g., bisphenol-A) and various aromatic acids such as isophthalic and terephthalic acids or mixtures thereof.
18. Aromatic copolyestercarbonates having carbonate as well as ester linkages present in the backbone of the polymers such as those derived from bisphenols, iso- and terephthaloyl chlorides and phosgene.
19. Polyurethanes and polyureas.
20. Polyacetals such as polyoxymethylenes and polyoxymethylenes which contain ethylene oxide as a comonomer.
21. Polysulfones, polyethersulfones and polyimidesulfones.
22. Polyamides and copolyamides which are derived from diamines and dicarboxylic acids and/or from aminocarboxylic acids or the corresponding lactams such as the following nylons; 6,6/6, 6/10, 11 and 12.
23. Polyimides polyetherimides, polyamideimides and copolyetheresters.
24. Crosslinked polymers which are derived from aldehydes on the one hand and from phenols, ureas and melamine on the other hand such as phenol-formaldehyde, urea-formaldehyde and melamine-formaldehyde resins.
25. Alkyl resins such as glycerol-phthalic acid resins and mixtures thereof with melamine-formaldehyde resins.
26. Blends of vinyl monomers and unsaturated polyester resins which are derived from copolyesters of saturated and unsaturated dicarboxylic acids with polyhydric alcohols as well as from vinyl compounds (crosslinking agents) and also halogen-containing, flame resistant modifications thereof.
27. Natural polymers such as cellulose, natural rubber as well as the chemically modified homologous derivatives thereof such as cellulose acetates, cellulose propionate, cellulose butyrate and the cellulose ethers such as methyl and ethyl cellulose.

In addition the polymer bound stabilizers of this invention may be used to stabilize various combinations or blends of the above polymers or copolymers. They are particularly useful in the stabilization of polyolefins, acrylic coatings, styrenics, rubber modified styrenics, poly(phenylene oxides) and their various blends with strenics, rubber-modified styrenics or nylon.

EXAMPLES

The following reactive additives were used in the preparation of the multipurpose polymer bound stabilizers of the examples:

A. (4-benzoyl-3-hydroxyphenoxy)acetylhydrazide (MW=285)
B. 3-(3,5-di-t-butyl-4-hydroxyphenyl)propionhydrazide (MW=292)
C. beta-(n-hexylmercapto)propionhydrazide (MW=204.3)
D. 4-amino-2,2,6,6-tetramethylpiperidine (MW=156.3)
E. 3,5-di-t-butyl-4-hydroxybenzhydrazide (MW=265)
F. S-(2-benzothiazolyl)thioglycolic acid hydrazide (MW=239.3)
G. S-(2-benzimidazolyl)thioglycolic acid hydrazide (MW=222)
H. N-phenyl-1,4-phenylenediamine (MW=184.2)
I. (4-(2H-benzotriazol-2-yl)-3-hydroxyphenoxy)acetyl hydrazide (MW=300)
J. salicylic acid hydrazide (MW=152.1)
K. 3-(3,5-di-t-butyl-4-hydroxyphenyl)propanamine (MW=263)
L. S-(3,5-di-t-butyl-4-hydroxybenzyl)thioglycolic acid hydrazide (MW=324)
M. N-(3-hydroxy-4-phenoxycarbonyl)phenyl-N'-aminooxamide (MW=315.4)
O. N-(2,2,6,6-tetramethyl-4-piperidinyl)-N'-aminooxamide (MW=242.3)
P. N-(2,2,6,6-tetramethyl-4-piperidinyl)-N'-aminosuccinamide (MW=270)
Q. 2-(2-hydroxy-3-aminomethyl-5-methylphenyl)-2H-benzotriazole (MW=254)
R. N-(2,4,6-tribromophenyl)-N'-aminooxamide (MW=415)
S. t-octylamine (Aldrich) (MW=129)
T. Jeffamine ™ M-360 (Texaco Chemical Co.)
U. N-(2,6-di-t-butyl-4-hydroxyphenyl)-N'-aminooxamide (MW=307)
V. N-(2,2,6,6-tetramethyl-4-piperidinyl)-N'-aminomalonamide (MW=256)
W. N-(1-acetyl-2,2,6,6-tetramethyl-4-piperidinyl)-N'-aminooxamide (MW=284)
X. alpha-(tetrabromophthalimido)acetyl hydrazide (MW=535)
Y. beta-(2,2,6,6-tetramethyl-4-piperidinylamino)-propionyl hydrazide (MW=242)

Reactive stabilizers A, E, F, G, and I were prepared by the hydrazinolysis of the corresponding methyl or ethyl esters. Reactive stabilizers B and C were prepared by the hydrazinolysis of the corresponding perntaerythritol tetraesters (Irganox 1010, a product of the Ciba-Geigy Corp and Mark 2140, a product of Witco Chemical Corp). Stabilizer K was prepared by the reduction of the corresponding nitrile. Stabilizer L was prepared by the reaction of 3,5-di-t-butyl-4-hydroxybenzyl chloride with the sodium salt of thioglycolic acid hydrazide. Stabilizer M was prepared by the reaction of phenyl p-aminosalicylate with ethyl oxalyl chloride in the presence of triethylamine and hydrazinolysis of the resultant oxamate with an equivalent amount of hydrazine hydrate. Reactive additives D, H, J, and S were purchased from Aldrich Chemical Co. Reactive additives O, P, and V were prepared by the reaction of 4-amino-2,2,6,6-tetramethylpiperidine with ethyl oxalyl chloride, ethyl succinoyl chloride and ethyl malonyl chloride respectively and hydrazinolysis of the resultant esters. Reactive additive Q was prepared using the procedure described in U.S. Pat. No. 3,629,192. Reactive additives R and U were prepared by the reaction of 2,4,6-tribromoaniline and 4-amino-2,6-di-t-butylphenol respectively with ethyl oxalyl chloride followed by hydrazinloysis of the resultant esters. Reactive additive W was prepared by reacting 4-amino-2,2,6,6-tetramethylpiperidine with diethyl oxalate, acylating the resulting ethyl N-(2,2,6,6-tetramethyl-4-piperidinyl)oxamate with acetyl chloride and then reacting the acetylated derivative with hydrazine hydrate in methanol. Jeffamine TM M-360 (reactive additive T) was obtained from the Texaco Chemical Co. Reactive additive X was prepared by reaction of ethyl glycinate with tetrabromophthalic anhydride followed by hydrazinolysis of the resulting imide-ester. Reactive additive Y was prepared by reacting 4-amino-2,2,6,6-tetramethylpiperidine with ethyl chloroacetate followed by hydrazinolysis of the resulting ethyl ester (as in U.S. Pat. No. 4,153,596).

Uvinul 408, 2-hydroxy-4-octoxybenzophenone, a commercial UV absorber from BASF and Irganox 1010, tetrakis[methylene(3,5-di-t-butyl-4-hydroxyhydrocinnamate)]-methane, a commercial hindered phenol from Ciba-Geigy were used as controls.

The following maleic anhydride copolymers were used in the preparation of the multipurpose polymer bound stabilizers of the examples.

SMA TM 1000 is a low molecular weight alternating copolymer of styrene and maleic anhydride with number average molecular weight of approximately 1600.

SMA TM 2000 is a low molecular weight copolymer of styrene and maleic anhydride containing approximately 2 styrene units for each maleic anhydride unit and has a number average molecular weight of approximately 1700.

SMA TM 3000 is a low molecular weight copolymer of styrene and maleic anhydride containing approximately 3 styrene units for each maleic anhydride unit and has a number average molecular weight of approximately 1900. These SMA resins are products of the Arco Chemical Company.

Plexar TM 2581 is a maleic anhydride modified low density polyethylene commercially available from Enron Chemical Company. Plexar TM 2110 is a maleic anhydride modified polypropylene which is also available from Enron Chemical Company.

EMA-1103 is an alternating ethylene-maleic anhydride copolymer and was obtained from the Monsanto Chemical Co.

Cadon TM resins are a commercial series of styrene-maleic anhydride polymer alloys with ABS and were obtained from the Monsanto Chemical Co.

PA-18 is a copolymer of 1-octadecene and maleic anhydride and was obtained from Chevron Chemical Co. It has a molecular weight of about 50,000.

Gantrez AN 119 is a methyl vinyl ether-maleic anhydride copolymer commercial available from GAF.

The Dylark TM resins are high molecular weight non-equimolar copolymers of styrene and maleic anhydride commercially available from Arco Chemical Company. Dylark TM 240 and 250 are rubber modified while Dylark TM 232 is not. Dylark TM 250 is prepared by polymerizing about 92% by weight sytrene monomer and about 8% by weight maleic anhydride, in the presence of about 18 parts by weight Stereon TM Rubber 720 (Firestone Synthetic Rubber and Latex Co.) per 100 parts of combined styrene and maleic anhydride.

The graft polyol solution of Example XXVI was prepared by polymerizing 276 g of styrene and 24 g of maleic anhydride with 30 g of the bis-t-butyl monoperoxycarbonate of NIAX PPG 4025 in 450 g of xylene. The conversion to polymer was about 78% and the solution was used as such. NIAX PPG 4025 is a polypropylene oxide polyol available from Union Carbide Corporation. It was converted to the corresponding chloroformate with phosgene and peroxidized with t-butyl hydroperoxide in the presence of a base.

Ricon 184/MA is a polybutadiene-polystyrene-maleic anhydride terpolymer and is a product of Colorado Chemical Specialties, Inc.

The HIPS used was Dow Styron 489 W.

EXAMPLES I TO XLVIII

Attachement of Reactive Stabilizers to Maleic Anhydride Copolymers

In these examples (see Table I), approximately 0.0327 equivalents (based on maleic anhydride) of the indicated maleic anhydride copolymer was weighed into a 250 ml 3-neck flask. The flask was equipped with a Dean-Stark trap containing a water cooled reflux condenser, a magnetic stirrer, thermometer and ground glass stopper. Approximately 130–150 ml of xylene were added to the flask and the flask was heated in an oil bath to 120°–140° C. The reactive stabilizers (0.01 mole of each) were either added prior to heating or after the temperature had reached 100° C. When the stabilizers were added above 120° C., they were added slowly over 2–5 minutes by momentarily removing the stopper and adding small portions at short intervals to prevent excessive foaming. Generally, the reactive stabilizers were allowed to react at the reflux temperature for 10–15 minutes before adding the next reactive stabilizer. After all the stabilizers were added, the reaction mixture was refluxed strongly for 0.5 hour to 5 hours depending on the reactivity of the additives. The reaction was monitored by following the water that azeotroped over in the Dean-Stark trap and by periodically withdrawing samples of the reaction mixture and running infrared spectra on the samples. The conversion of the anhydride peak at 1780 cm$^{-1}$ to the imide peak around 1710 to 1740 cm$^{-1}$ indicated the extent of the reaction in most cases. Reaction was generally complete after refluxing the reaction mixture for 15 minutes. After the reflux period was complete, the reaction mixture was cooled below 90° C. If the product was insoluble in the hot xylene, the mixture was filtered; the filter cake was washed with hexane to remove residual xylene and air dried on a watch glass. If the product was soluble in the hot xylene, the mixture was transferred to a 500 ml round bottom flask and the xylene was stripped off on a rotary evaporator under reduced pressure. The last portion of xylene was driven off by heating the flask with a heat gun. Upon completion of the stripping, the product was scraped out of the flask and pulverized in a mortar with a pestle. The pulverized product was then dried to constant weight on a watch glass.

TABLE I

| EXAMPLE NUMBER | MA COPOLYMER | gms COPOLYMER | STABILIZER 1 | STABILIZER 2 | STABILIZER 3 |
| --- | --- | --- | --- | --- | --- |
| I | SMA 2000 | 10.0 | A | B | F |

TABLE I-continued

| EXAMPLE NUMBER | MA COPOLYMER | gms COPOLYMER | STABILIZER 1 | STABILIZER 2 | STABILIZER 3 |
|---|---|---|---|---|---|
| II | SMA 3000 | 13.4 | A | B | F |
| III | SMA 1000 | 6.6 | A | B | F |
| IV | SMA 3000 | 13.4 | A | B | C |
| V | SMA 3000 | 13.4 | A | B | D |
| VI | SMA 3000 | 13.4 | A | B | B |
| VII | SMA 3000 | 13.4 | H | A | D |
| VIII | SMA 3000 | 13.4 | A | B | G |
| IX | SMA 3000 | 13.4 | E | E | D |
| X | SMA 3000 | 13.4 | E | C | B |
| XI | SMA 3000 | 13.4 | E | C | A |
| XII | PA-18 | 11.7 | C | E | B |
| XIII | PA-18 | 11.7 | C | B | A |
| XIV | SMA 3000 | 13.4 | J | C | A |
| XV | SMA 3000 | 13.4 | I | C | B |
| XVI | SMA 3000 | 13.4 | B | I | D |
| XVII | SMA 1000 | 6.6 | C | B | A |
| XVIII | SMA 1000 | 6.6 | E | C | B |
| XIX | SMA 1000 | 6.6 | E | C | A |
| XX | SMA 1000 | 6.6 | F | B | A |
| XXI | SMA 1000 | 6.6 | C | K | A |
| XXII | SMA 1000 | 6.6 | E | L | A |
| XXIII | PA-18 | 11.7 | O | O | M |
| XXIV | PA-18 | 11.7 | B | O | M |
| XXV | GANTREZ AN 119 | 5.1 | B | C | — |
| XXVI | GRAFT POLYOL | 98.0 | B | C | A |
| XXVII | RICON 184/MA | 56.6 | B | C | A |
| XXVIII | SMA 3000 | 13.4 | O | B | E |
| XXIX | SMA 3000 | 13.4 | B | A | O |
| XXX | SMA 3000 | 13.4 | E | Q | P |
| XXXI | SMA 1000 | 6.6 | E | F | Q |
| XXXII | SMA 3000 | 13.4 | E | F | Q |
| XXXIII | SMA 3000 | 13.4 | E | I | D |
| XXXIV | SMA 3000 | 13.4 | F | Q | D |
| XXXV | SMA 3000 | 13.4 | E | F | D |
| XXXVI | SMA 3000 | 13.4 | F | A | D |
| XXXVII | SMA 3000 | 13.4 | L | A | D |
| XXXVIII | SMA 3000 | 13.4 | L | A | O |
| XXXIX | SMA 3000 | 13.4 | L | Q | O |
| XL | SMA 3000 | 13.4 | F | E | A |
| XLI | SMA 3000 | 13.4 | F | A | P |
| XLII | SMA 3000 | 13.4 | F | A | O |
| XLIII | SMA 3000 | 13.4 | F | A | — |
| XLIV | SMA 3000 | 13.4 | A | B | R |
| XLV | SMA 3000 | 13.4 | A | P | S |
| XLVI | EMA 1103 | 4.1 | A | B | P |
| XLVII | EMA 1103 | 4.1 | A | B | — |
| XLVIII | SMA 3000 | 13.4 | B | W | O |

EXAMPLES IA TO XXII-A, AND XXVIII-A TO XLIII-A

Copolymers and HIPS

The modified MA copolymers prepared in Examples I to XXII, and XXVIII to XLIII were blended with high impact polystyrene (HIPS) in a Brabender Prep Center Mixer at 200° C. under a nitrogen atmosphere for 10-15 minutes. The blend was removed from the mixer, cooled, ground up in a grinder and injection molded in a Newbury 25 ton injection molding machine at 400° F. into $7\frac{3}{8}"\times\frac{3}{4}"\times\frac{1}{8}"$ tensile bars (see Table II).

The tensile bars were placed in a QUV Accelerated Weathering Tester (Q Panel Company) for various exposure times. The QUV operated with an 8 hour light cycle (UV-B) at 60° C. and a 4 hour condensation cycle at 50° C. Samples were placed in the QUV and withdrawn at approximately the same time each day during the condensation cycle. Samples withdrawn from the QUV were evaluated for change in yellowing ($\Delta E$) on a Colorgard System/05 (Pacific Scientific) colorimeter. Control samples without antioxidants or UV stabilizers as well as control samples containing commerical antioxidants and UV stabilizers were also prepared in the mixer and evaluated in this manner for comparison (see Tables II and III).

Exposed and unexposed tensile bars were also subjected to the notched Izod impact test and the change in Izod impact strength $\Delta I$ (ft-lbs/in) upon QUV exposure determined (see Table IV).

TABLE II

BLENDS OF MODIFIED MA COPOLYMERS AND HIPS

| EXAMPLE # | MODIFIED COPOLYMER | MA (g) | HIPS (g) | ATTACHED ADDITIVES | DELTA E AFTER QUV EXPOSURE (HRS) | | | | | |
|---|---|---|---|---|---|---|---|---|---|---|
| | | | | | 24 | 48 | 96 | 144 | 192 | 240 |
| I-A | I | 12.1 | 200 | A,B,F | 7.7 | 10.6 | 12.9 | | | 15.4 |
| II-A | II | 14.4 | 200 | A,B,F | 6.4 | 12.2 | 14.4 | 16.1 | | 18.1 |
| III-A | III | 9.8 | 200 | A,B,F | 7.6 | 11.0 | 12.8 | 15.6 | | 15.2 |
| IV-A | IV | 14.2 | 200 | A,B,C | 8.5 | 11.4 | 16.3 | 18.6 | | 20.8 |
| V-A | V | 13.9 | 200 | A,B,D | 1.0 | 2.3 | 3.2 | 5.3 | | 6.1 |
| VI-A | VI | 14.7 | 200 | A,B,B | 3.3 | 4.6 | 6.7 | 9.8 | | 10.8 |

TABLE II-continued

BLENDS OF MODIFIED MA COPOLYMERS AND HIPS

| EXAMPLE # | MODIFIED COPOLYMER | MA (g) | HIPS (g) | ATTACHED ADDITIVES | DELTA E AFTER QUV EXPOSURE (HRS) | | | | | |
|---|---|---|---|---|---|---|---|---|---|---|
| | | | | | 24 | 48 | 96 | 144 | 192 | 240 |
| VII-A | VII | 13.2 | 200 | H,A,D | 6.2 | 10.1 | 7.4 | 10.7 | | 11.2 |
| VIII-A | VIII | 14.2 | 200 | A,B,G | 4.1 | 6.1 | 5.8 | 8.1 | | 8.6 |
| IX-A | IX | 13.5 | 200 | E,E,D | 2.7 | 3.5 | 6.9 | 9.8 | | 11.6 |
| X-A | X | 14.0 | 200 | E,C,B | 14.5 | 16.6 | 22.5 | 26.2 | | 26.9 |
| XI-A | XI | 14.0 | 200 | E,C,A | 11.2 | 13.4 | 18.3 | 21.6 | | 23.6 |
| XII-A | XII | 12.9 | 200 | C,E,B | 6.1 | 11.9 | 20.1 | | | 25.7 |
| XIII-A | XIII | 13.0 | 200 | C,B,A | 1.2 | 4.0 | 8.5 | | | 12.7 |
| XIV-A | XIV | 13.2 | 200 | J,C,A | 8.6 | 12.4 | 18.4 | | | 23.0 |
| XV-A | XV | 14.3 | 200 | I,C,B | .4 | 3.1 | 9.6 | | | 13.6 |
| XVI-A | XVI | 13.9 | 200 | B,I,D | 9.8 | 12.7 | 13.5 | | | |
| XVII-A | XVII | 9.6 | 200 | C,B,A | 6.9 | 10.5 | 15.7 | | | 21.4 |
| XVIII-A | XVIII | 9.5 | 200 | E,C,B | 5.8 | 13.1 | 20.2 | | | 26.1 |
| XIX-A | XIX | 9.4 | 200 | E,C,A | 3.5 | 7.0 | 14.9 | | | 20.4 |
| XX-A | XX | 9.8 | 200 | F,B,A | 4.9 | 9.3 | 17.1 | | | 18.7 |
| XXI-A | XXI | 9.4 | 200 | C,K,A | 1.1 | 2.3 | 5.8 | | | 8.0 |
| XXII-A | XXII | 10.2 | 200 | E,L,A | 6.1 | 10.8 | 18.5 | | | 24.9 |
| XXVIII-A | XXVIII | 17.7 | 250 | E,B,O | 3.6 | 6.3 | 13.6 | 16.6 | 16.2 | 18.0 |
| XXIX-A | XXIX | 17.9 | 250 | A,B,O | 1.6 | 1.3 | 4.3 | 8.1 | 7.8 | 9.0 |
| XXX-A | XXX | 17.7 | 250 | Q,E,P | .6 | .6 | 4.3 | 7.3 | 7.0 | 7.8 |
| XXXI-A | XXXI | 11.8 | 250 | Q,E,F | 4.0 | 7.8 | 12.6 | 13.6 | 13.0 | 13.8 |
| XXXII-A | XXXII | 17.4 | 250 | Q,F,F | 3.4 | 6.6 | 11.2 | 13.0 | 12.3 | 12.9 |
| XXXIII-A | XXXIII | 17.1 | 250 | I,E,D | 1.9 | 1.0 | 3.7 | 7.6 | 6.9 | |
| XXXIV-A | XXXIV | 16.9 | 250 | I,F,D | 1.3 | 3.8 | 8.4 | 10.0 | 10.3 | 10.4 |
| XXXV-A | XXXV | 17.4 | 250 | E,F,D | 3.0 | 7.1 | 12.3 | 13.6 | 14.1 | 14. |
| XXXVI-A | XXXVI | 16.8 | 250 | A,F,D | 1.6 | 2.6 | 7.2 | 8.1 | 8.2 | 8. |
| XXXVII-A | XXXVII | 17.5 | 250 | A,L,D | 2.3 | 3.7 | 7.1 | 9.3 | 10.0 | 10. |
| XXXVIII-A | XXXVII | 18.2 | 250 | A,L,O | 2.7 | 5.2 | 10.0 | 12.1 | 13.3 | 13. |
| XXXIX-A | XXXIX | 17.9 | 250 | Q,L,O | 1.9 | 3.3 | 7.1 | 8.7 | 9.7 | 9. |
| XL-A | XL | 17.7 | 250 | A,E,F | 8.1 | 13.1 | 19.1 | 21.1 | 22.6 | 22. |
| XLI-A | XLI | 17.7 | 250 | A,F,P | 1.2 | 2.4 | 6.4 | | 8.0 | 8. |
| XLII-A | XLII | 17.5 | 250 | A,F,O | 2.0 | 5.3 | 11.1 | 12.4 | 13.3 | 12. |
| XLIII-A | XLIII | 15.5 | 250 | A,F | 6.8 | 11.9 | 18.0 | 19.4 | 19.7 | 19. |

TABLE III

BLENDS OF MA COPOLYMERS AND HIPS (CONTROLS)

| # | MA COPOLYMER | WT % | WT % HIPS | UV STAB | WT % | ANTI-OXIDANT | WT % | DELTA E AFTER QUV (HRS) | | | | |
|---|---|---|---|---|---|---|---|---|---|---|---|---|
| | | | | | | | | 24 | 48 | 96 | 144 | 240 |
| C-1 | SMA 3000 | 4.26 | 95.74 | NONE | — | NONE | — | 5.2 | 10.1 | 18.5 | — | 21.3 |
| C-2 | SMA 1000 | 2.15 | 97.85 | NONE | — | NONE | — | 2.6 | 9.6 | — | — | 23.7 |
| C-3 | SMA 3000 | 4.18 | 93.94 | * | .94 | ** | .94 | 1.5 | 1.7 | 7.5 | — | 12.0 |
| C-4 | SMA 3000 | 4.15 | 93.06 | * | .93 | ** | 1.86 | 2.9 | 3.3 | 8.3 | 13.6 | 12.2 |
| C-5 | PA-18 | 3.75 | 96.24 | NONE | — | NONE | — | 5.8 | 11.9 | 20.6 | — | 23.9 |

*UVINUL 408 (BASF)
**IRGANOX 1010 (CIBA-GEIGY)

TABLE IV

BLENDS OF MODIFIED MA COPOLYMERS AND HIPS

| EXAMPLE # | MA COPOLYMER | ADDITIVES | DELTA I AFTER QUV EXPOSURE (HRS) | | | | | |
|---|---|---|---|---|---|---|---|---|
| | | | 24 | 48 | 96 | 144 | 240 | 500 |
| C-2 | SMA 1000 | NONE | −.56 | −1.20 | — | | −1.63 | — |
| XXI-A | SMA 1000 | A,K,C | −.04 | — | −.08 | — | — | −.28 |
| XX-A | SMA 1000 | A,B,F | −.09 | −.09 | −.06 | — | — | −.09 |
| XXII-A | SMA 1000 | A,E,L | — | — | −.03 | — | — | −.04 |
| C-1 | SMA 3000 | NONE | −.07 | −.34 | −.38 | — | −.48 | — |
| C-3 | SMA 3000 | 1010/408* | .08 | −.23 | — | — | −.23 | — |
| XLI-A | SMA 3000 | A,F,P | −.08 | −.16 | −.14 | −.24 | −.39 | — |
| XXIX-A | SMA 3000 | A,B,O | 0.00 | .06 | −.07 | −.09 | −.30 | — |
| XXXIV-A | SMA 3000 | I,F,O | .08 | .08 | −.24 | −.24 | −.24 | — |
| XXXIX-A | SMA 3000 | Q,L,O | .06 | — | −.04 | — | −.21 | — |
| XXXVII-A | SMA 3000 | A,L,O | −.08 | −.08 | −.17 | — | −.19 | — |
| XXXVIII-A | SMA 3000 | A,L,O | −.01 | — | −.16 | — | −.17 | — |
| C-5 | PA-18 | NONE | — | — | −.24 | — | −.42 | — |
| XIII-A | PA-18 | A,B,C | — | — | −.10 | — | −.16 | — |

*IRGANOX 1010 (CIBA-GEIGY) AND UVINUL 408 (BASF)

EXAMPLES XLIV TO LV

Preparation and Evaluation of Modified Maleic Anhydride Copolymers

Modified maleic anhydride copolymers were prepared in a melt-mixing operation in a Brabender Prep Center Mixer at 190°–200° C. under a nitrogen atmosphere. The maleic anhydride copolymer was added to the hot mixer and melted with mixing under nitrogen. The reactive additives (0.0084 mol each) were added either individually or as a mixture and the molten mass mixed 10–15 minutes to allow complete reaction. The modified copolymer was removed from the mixer, cooled, ground up in a grinder and injection molded in a Newbury 25 ton injection molding machine into 7⅜"×¾"×150 " tensile bars (see Table V). Controls were also prepared by melt mixing the copolymers alone or with commercial stabilizers.

The tensile bars were exposed in the QUV for various lengths of time (as in Examples I-A to XXIV-A) and evaluated for change in yellowing (ΔE) (see Table V).

TABLE V

| | | MODIFIED MALEIC ANHYDRIDE COPOLYMERS | | | | | | | | | | | | |
|---|---|---|---|---|---|---|---|---|---|---|---|---|---|---|
| EX | MA | | ADDITIVES | | | | | DELTA E AFTER QUV (HRS) | | | | | | |
| # | COPOLYMER | WT % | #1 | WT % | #2 | WT % | #3 | WT % | 24 | 48 | 96 | 144 | 192 | 240 |
| XLIV | DYLARK 232 | 97.46 | A | .94 | B | .94 | C | .66 | .5 | .5 | 4.5 | 6.1 | 5.8 | — |
| XLV | DYLARK 250 | 97.46 | A | .94 | B | .94 | C | .66 | .5 | 2.0 | 8.8 | 10.2 | 10.2 | 10.1 |
| XLVI | CADON 127 | 97.46 | A | .94 | B | .94 | C | .66 | 2.0 | 3.2 | 8.5 | 11.4 | 13.0 | 12.5 |
| XLVII | CADON 140 | 97.46 | A | .94 | B | .94 | C | .66 | 2.8 | 3.6 | 7.1 | 9.3 | 10.3 | 11.1 |
| XLVIII | CADON 127 | 96.93 | E | 1.02 | B | 1.12 | D | .93 | 7.3 | 10.1 | 14.3 | 16.7 | 17.9 | 19.2 |
| XLIX | CADON 127 | 97.69 | E | .86 | B | .94 | D | .51 | 9.1 | 12.2 | 16.3 | 19.4 | 20.5 | 20.8 |
| L- | CADON 127 | 97.66 | I | .97 | E | .86 | D | .51 | 2.4 | 4.4 | 7.5 | 10.4 | 12.0 | 12.6 |
| LI | CADON 127 | 97.42 | A | .94 | E | .86 | F | .78 | 4.3 | 7.2 | 11.8 | 13.4 | 15.0 | 14.8 |
| LII | CADON 127 | 97.54 | Q | .82 | E | .86 | F | .78 | 3.0 | 5.3 | 9.3 | 11.1 | 12.5 | 12.7 |
| LIII | CADON 140 | 97.42 | A | .94 | D | .86 | F | .78 | 2.2 | 3.6 | 6.3 | 6.0 | 10.0 | 11.5 |
| LIV | PLEXAR 2581 | 99.40 | A | .30 | B | .30 | — | — | — | — | — | — | — | — |
| LV | PLEXAR 2110 | 99.50 | A | .25 | B | .50 | — | — | — | — | — | — | — | — |
| C-6 | DYLARK 232 | 100.00 | — | — | — | — | — | — | 7.0 | 9.2 | 14.3 | 17.4 | — | 18.5 |
| C-7 | DYLARK 232 | 98.04 | * | .98 | ** | .98 | — | — | 1.6 | 1.9 | — | 4.3 | 3.7 | 3.3 |
| C-8 | DYLARK 250 | 100.00 | — | — | — | — | — | — | 10.8 | 14.3 | 21.6 | 23.1 | 23.6 | 23.8 |
| C-9 | DYLARK 250 | 98.04 | * | .98 | ** | .98 | — | — | 2.4 | 2.5 | 4.6 | 5.1 | 5.2 | 5.0 |
| C-10 | CADON 127 | 100.00 | — | — | — | — | — | — | 10.1 | 13.2 | 17.7 | 20.9 | 22.2 | 22.4 |
| C-11 | CADON 127 | 98.04 | * | .98 | ** | .98 | — | — | 2.2 | 2.2 | 6.3 | 9.1 | 10.4 | 12.4 |
| C-12 | CADON 140 | 100.00 | — | — | — | — | — | .— | 7.6 | 10.6 | 15.4 | 17.0 | 19.4 | 19.9 |
| C-13 | CADON 140 | 98.04 | * | .98 | ** | .98 | — | — | 2.9 | 3.5 | 6.8 | 9.0 | 11.6 | 11.0 |

*UVINUL 408 (BASF)
**IRGANOX 1010 (CIB-GEIGY)

EXAMPLES LVI TO LX

Attachment of Reactive Stabilizers to Dylark ™ Resins

In these examples (see Table VI) the indicated amount of Dylark ™ resin was dissolved in 100–125 ml of hot xylene in a 250 ml 3-neck flask. The flask was equipped with a Dean-Stark trap containing a water-cooled reflux condenser, magnetic stirrer, thermometer and ground glass stopper. The flask was heated in an oil bath to 120°–140° C. and the indicated amounts of the reactive additives were added in small increments over 2 to 5 minutes. Generally, the first additive was allowed to react at reflux temperature until water ceased azeotroping before the next reactive additive was added. The reaction mixture was then refluxed for 1 to 2 hours after the reaction appeared to be complete (no more water in azeotrope). The extent of reaction was also monitored by infrared spectroscopy on samples of the reaction mixture withdrawn at various intervals.

Upon completion of the reflux period, the reaction mixture was cooled to 80° C. and stirred into 800–1000 mls of methanol. A sticky precipitate formed which coagulated into a ball. The methanol-xylene solution was decanted off and the solvent squeezed out of the product. The product was then ground up in a Waring Blender with 500 mls of fresh methanol. The resulting coarse particles were filtered off and air dried overnight.

TABLE VI

| | | | | MODIFICATIOPN OF DYLARK ™ RESINS | | | | | |
|---|---|---|---|---|---|---|---|---|---|
| EX | DYLARK RESIN | | | REACTIVE ADDITIVE | | | | REFLUX | YIELD |
| # | # | (g) | eq MA | #1 (mol) | #2 (mol) | #3 (mol) | #4 (mol) | HOURS | (g) |
| LVI | 232 | 10 | .009 | U (.0075) | A (.0015) | — | — | 5.5 | 11.8 |
| LVII | 232 | 10 | .018 | R (.005) | A (.0015) | B (.0015) | C (.0015) | 0.6 | 12.2 |
| LVIII | 232 | 20 | .018 | T (.01) | A (.003) | B (.0035) | — | 0.3 | 24.7 |
| LXIX | 250 | 20 | .018 | T (.01) | A (.003) | B (.0035) | — | 1.5 | 20.8 |
| LX | 232 | 20 | .018 | B (.005) | C (.010) | — | — | 0.2 | 23.3 |

EXAMPLE LXI

Attachment of Reactive Stabilizers to Dylark ™ 232 in the Presence of HIPS

Dylark ™ 232 (50 g, 0.045 eq. maleic anhydride) and HIPS (150 g) were added to a Brabender Prep Center Mixer (see Example I-A) and mixed for 5 minutes under nitrogen at 200° C. to obtain a uniform blend. To this blend were added 2.9 g reactive stabilizer B in small increments over 1 minute, 2.85 g reactive stabilizer A, 2.05 g reactive stabilizer C and 3.3 g Jeffamine M-360 ™ in similar fashion. The mixture was mixed for 10 minutes at 30–40 RPM at 200° C. under nitrogen. Upon completion of the mixing cycle the blend was scraped out of the mixer, cooled and ground up in a grinder. An infrared scan on a chloroform solution of a small amount of the ground up material indicated almost complete conversion of the anhydride to imide, demonstrating that all the reactive stabilizers reacted with the Dylark ™ 232 in high yield.

The ground up product was injection molded in a Newbury 25 ton injection molding machine at 480° F. into tensile bars as in Example I-A. The tensile bars were placed in a QUV Accelerated Weathering Tester for various exposure times and evaluated as in Example I-A (see Table VII).

EXAMPLE LXII

Attachment of Reactive Stabilizers to Dylark TM 250 in the Presence of HIPS

This was a repeat of Example LXI except 50 g of Dylark TM 250 was substituted for the 50 g of Dylark 232 used in Example LXI.

An infrared scan on a chloroform solution of a small amount of the ground up material indicated almost complete conversion of the anhydride to imide demonstrating that all the reactive additives attached to the Dylark TM resin in high yield.

The product was injection molded into tensile bars and exposed in a QUV accelerated weather tester for various exposure times as in Example LXI (see Table VII).

TABLE VII

| | | BLENDS OF MODIFIED DYLARK TM RESINS AND HIPS | | | | | | | | | |
|---|---|---|---|---|---|---|---|---|---|---|---|
| EX | DYLARK | ATTACHED | DELTA E AFTER QUV (HRS) | | | | | DELTA I AFTER QUV (HRS) | | | |
| # | RESIN | ADDITIVES | 50 | 96 | 192 | 312 | 980 | 50 | 96 | 192 | 312 | 98 |
| LXI | 232 | A,B,C,T | 1.9 | 1.4 | 5.3 | 5.0 | — | — | −.21 | — | −.17 | −.4 |
| LXII | 250 | A,B,C,T | 0.9 | 3.7 | 5.2 | 5.2 | 5.6 | — | −.41 | −.18 | −.13 | −.8 |

EXAMPLE LXIII

Attachment of Reactive Stabilizers to Dylark TM 250 in the Presence of HIPS

This example is similar to Example LXII except the reactive stabilizers were added to a molten blend of 62.5 g of Dylark TM 250 and 197.5 g of HIPS. The blend was mixed for 5 minutes under nitrogen at 200° C. before adding 4.6 g reactive stabilizer H, 3.9 g of reactive stabilizer D and mixing for an additional 10 minutes. The mixture was scraped out of the mixer, cooled, dried and ground up in a grinder. An infrared scan on a chloroform solution of a small amount of the ground up material indicated almost complete conversion of the anhydride to N-substituted maleimide.

EXAMPLE LXIV

Attachment of Reactive Stabilizers to Dylark TM 250 in the Present of HIPS

This example is similar to Example LXII except the reactive stabilizers were added to a molten blend of 50 g of Dylark TM 250 and 150 g of HIPS. The blend was mixed for 5 minutes under nitrogen at 200° C. before adding 5.72 g reactive stabilizer A and 3.12 g reactive stabilizer D and mixing an additional 10 minutes. The mixture was removed from the mixer and ground up as in Example LXII. An infrared scan of a chloroform solution of the product confirmed that most of the anhydride had reacted.

EXAMPLE LXV

Attachment of Reactive Stabilizer to Dylark TM 250 in the Presence of HIPS

This example is a repeat of Example LXIV except that 2.86 g of reactive stabilizer A, 1.84 g of reactive stabilizer H, 1.56 g of reactive stabilizer D and 2.92 g of reactive stabilizer R were added to a molten blend of 50 g of Dylark TM 250 and 150 g HIPS. After completion of mixing, the blend was removed from the mixer and ground up. An infrared scan of a chloroform solution of the product confirmed that most of the anhydride had reacted.

EXAMPLE LXVI

Extrusion of Poly(phenylene oxide), HIPS and Modified Dylark TM 250

A blend was prepared by mixing 75 g of the HIPS-modified Dylark TM 250 blend from Example LXIV, 75 g of additional HIPS and 150 g of poly(phenylene oxide) (Aldrich) in a gallon jug until a uniform mixture was obtained. Three grams of tridecyl phosphite were added during the mixing to minimize degradation during the extrusion step. The mixture was then extruded at 260° C. in a Brabender Prep Center Extruder at 20 RPM. The non-fugitive stabilizer-containing polymer blend extrudate was cooled in a water bath, dried and ground up.

EXAMPLE LXVII

Extrusion of HIPS and HIPS-Modified Dylark TM 250 Masterbatch

A masterbatch of Dylark TM 250 modified with reactive stabilizers A and D and HIPS was let down to practical use levels by mixing 50 g of the master batch prepared in Example LXIV with 150 grams of additional HIPS in a glass jar to obtain a relatively uniform mixture. The mixture was then extruded at 200° C. in a Brabender Prep Center Extruder at 20 RPM. The non-fugitive stabilizer-containing polymer blend extrudate was cooled in a water bath, dried and ground up.

EXAMPLE LXVIII

Extrusion of HIPS and HIPS-Modified Dylark TM 250 Masterbatch

This example was run the same as Example LXVII except 50 g of the masterbatch prepared in Example LXV containing reactive stabilizers A, B, D and H were mixed with an additional 150 g of HIPS and extruded as in Example LXVIII.

The non-fugitive stabilizer-containing polymer blend extrudate was cooled in a water bath, dried and ground up.

EXAMPLES LXIX to LXXI

Extrusion of NORYL 731 with HIPS-Modified Dylark TM Masterbatches

Noryl 731 (175 g) (product of General Electric) was mixed with masterbatches (25 g) of Dylark TM 250 modified with reactive stabilizers and HIPS in a glass jar until a uniform mixture was obtained. The mixture was then extruded at 260° C. in a Brabender Prep Center Extruder at 20 RPM. The non-fugitive stabilizer-containing extrudate was cooled in a water bath and dried in an air circulating oven for 2 hours at 60° C. After drying, the extrudate was ground up in a grinder and injection molded at 510° F. into tensile bars as in Example I-A. The tensile bars were placed in a QUV for various exposure times and evaluated as in Example I-A (see Table VIII). A control was also prepared using 175 g of Noryl 731 and 25 g of HIPS.

TABLE VIII

BLENDS OF NORYL 731, HIPS AND DYLARK ™ 250
MODIFIED WITH ATTACHED STABILIZERS

| EX # | ←NORYL→ exp # | g | % | HIPS % | STAB % | ΔE AFTER QUV HRS 24 | 120 | 410 | ΔI AFTER QUV HRS 96 | 192 | 410 | 575 |
|---|---|---|---|---|---|---|---|---|---|---|---|---|
| LXIX | LXIV | 25 | 87.5 | 9.3 | .34% A .20% D | 10.3 | 12.5 | 13.6 | — | — | −.75 | −.68 |
| LXX | LXV | 25 | 87.5 | 9.3 | .17% A .17% B .10% D .11% H | 10.0 | 11.5 | 11.6 | −.50 | −.72 | −.70 | −.75 |
| LXXI | LXII | 25 | 87.5 | 9.3 | .20% D .22% H | 10.9 | 12.8 | 12.1 | −.61 | −.72 | −.95 | −1.15 |
| C-14 | | 25 | 87.5 | 12.5 | NONE | 11.1 | 13.5 | 13.6 | −.60 | −.79 | −1.24 | −1.60 |

*MASTERBATCH

What is claimed:

1. A polymer with recurring units having a formula

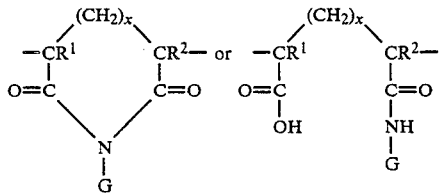

or both in which the units occur either in the polymer backbone, on grafted side chains, as pendant units, or as combinations thereof and wherein x is 0 or 1, $R^1$ and $R^2$ are independently hydrogen, alkyl of 1-6 carbons, cycloalkyl of 5-7 carbons, phenyl, chlorine or bromine and each

is the residue of a primary amino substituted stabilizer group selected from (a) hindered phenols, (b) hindered amine light stabilizers, (c) 2-hydroxybenzophenones, (d) 2-(2-hydroxyphenyl)-2H-benzotriazoles, (e) secondary aromatic amines, (f) mercaptobenzothiazoles or mercaptobenzimidazoles, (g) aryl salicylates, (h) salicylic acid derivatives, (i) oxamide derivatives or (j) dialkyl sulfides, with the proviso that at least two different groups from (a) through (j) are attached to the polymer.

2. The composition of claim 1 in which (a) is

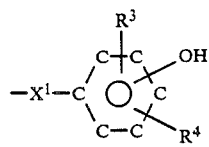

wherein $R^3$ is t-alkyl of 4-8 carbons, $R^4$ is hydrogen, hydroxyl, alkyl of 1-8 carbons or alkoxy of 1-8 carbons and $X^1$ is a direct bond or a divalent radical $-(CH_2)_y-$ or $-CH_2-CH_2-O-$ in which y is 1, 2 or 3.

3. The composition of claim 1 in which (b) is

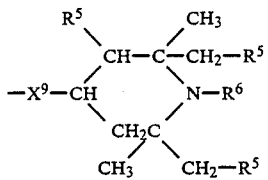

wherein
$R^5$ is hydrogen or alkyl of 1-4 carbons, $R^6$ hydrogen, oxyl, hydroxyl, alkyl of 1-20 carbons, alkenyl of 3-8 carbons, alkynyl of 3-8 carbons, aralkyl of 7-12 carbons, aliphatic acyl of 1-10 carbons, aromatic acyl of 7-13 carbons, alkoxycarbonyl of 2-9 carbons, aryloxycarbonyl of 7-15 carbons, alkyl, aryl, cycloalkyl or aralkyl substituted carbamoyl of 2-13 carbons, hydroxyalkyl of 1-5 carbons, 2-cyanoethyl, epoxyalkyl of 3-10 carbons or a polyalkylene oxide group of 4-20 carbons, and
$X^9$ is a direct bond or a divalent radical $-(CH_2)_y-$, $-CH_2-CH_2-O-$ or $-R^7-N(R^{23})-$, where y is 1, 2 or 3,
$R^7$ is alkylene of 2-12 carbons and
$R^{23}$ is hydrogen, alkyl of 1-10 carbons, aryl of 6-12 carbons, aralkyl of 7-12 carbons, cycloalkyl of 5-12 carbons, 2-cyanoethyl or a radical of the formula

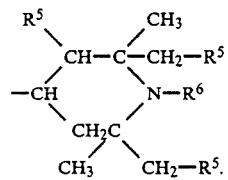

4. The composition of claim 1 in which (j) is $-X^2-C(=O)-(CH_2)_z-S-R^8$ wherein $R^8$ is aralkyl of 7-12 carbons, alkyl of 1-18 carbons or dialkylaminoalkyl of 3-12 carbons, z is 1 or 2 and $X^2$ is a divalent radical $-CH_2-CH_2-O-$ or $-R^7-N(R^{23})-$,
wherein
$R^7$ is alkylene of 2-12 carbons,
$R^{23}$ is hydrogen, alkyl of 1-10 carbons, aryl of 6-12 carbons, aralkyl of 7-12 carbons, cycloalkyl of 5-12 carbons or 2-cyanoethyl,
$R^5$ is hydrogen or alkyl of 1-4 carbons and
$R^6$ is hydrogen, oxyl, hydroxyl, alkyl of 1-20 carbons, alkenyl or alkynyl of 3-8 carbons, aralkyl of 7-12 carbons, aliphatic acyl of 1-10 carbons, aromatic acyl of 7-13 carbons, alkoxycarbonyl of 2-9 carbons, aryloxycarbonyl of 7-15 carbons, alkyl, aryl, cycloalkyl or aralkyl substituted carbamoyl of 2–13 carbons, hydroxyalkyl of 1–5 carbons, 2-cyanoethyl, epoxyalkyl of 3–10 carbons or a polyalkylene oxide group of 4–20 carbons.

5. The composition of claim 1 in which (c) is

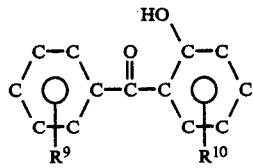

wherein $R^9$ and $R^{10}$ are independently hydrogen, hydroxyl, alkyl of 1–8 carbons, alkoxy of 1–4 carbons or a connecting group $X^3$, with the proviso that only one of either $R^9$ or $R^{10}$ can be the connecting group $X^3$, and $X^3$ is a direct bond or a divalent radical —$CH_2$—$CH_2$—O—, —$R^7$—$N(R^{23})$—$C(=O)$— or —$R^7$—$N(R^{23})$—$S(=O)_2$—, in which $R^7$ is alkylene of 2–12 carbons, $R^{23}$ is hydrogen, alkyl of 1–10 carbons, aryl of 6–12 carbons, aralkyl of 7–12 carbons, cycloalkyl of 5–12 carbons or 2-cyanoethyl, $R^5$ is hydrogen or alkyl of 1–4 carbons and $R^6$ is hydrogen, oxyl, hydroxyl, alkyl of 1–20 carbons, alkenyl or alkynyl of 3–8 carbons, aralkyl of 7–12 carbons, aliphatic acyl of 1–10 carbons, aromatic acyl of 7–13 carbons, alkoxycarbonyl of 2–9 carbons, aryloxycarbonyl of 7–15 carbons, alkyl, aryl, cycloalkyl or aralkyl substituted carbamoyl of 2–13 carbons, hydroxyalkyl of 1–5 carbons, 2-cyanoethyl, epoxyalkyl of 3–10 carbons or a polyalkylene oxide group of 4–20 carbons and optional substituents for the aromatic nuclei are one or more of hydroxyl, alkyl of 1–8 carbons or alkoxy of 1–4 carbons.

6. The composition of claim 1 in which (d) is

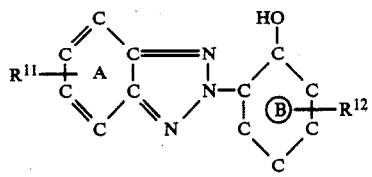

where $R^{11}$ is hydrogen, alkyl of 1–4 carbons, alkoxy of 1–4 carbons, carboxyl, alkoxycarbonyl of 2–11 carbons, carboxamide, chlorine, bromine, sulfonic acid, alkylsulfonyl, or the connecting group $X^4$, $R^{12}$ is hydrogen, alkyl of 1–8 carbons, aralkyl of 7–12 carbons, aryl of 6–14 carbons or the connecting group $X^5$, with the proviso that when $R^{12}$ is $X^5$, $R^{11}$ cannot be $X^4$, $X^4$ is a divalent radical —$R^7$—$N(R^{23})$—$S(=O)_2$— or —$R^7$—$N(R^{23})$—$C(=O)$—, in which $R^7$ is alkylene of 2–12 carbons, $R^{23}$ is hydrogen, alkyl of 1–10 carbons, aryl of 6–12 carbons, aralkyl of 7–12 carbons, cycloalkyl of 5–12 carbons or 2-cyanoethyl, $X^5$ is a direct bond or a divalent radical —$(CH_2)_y$— or —$CH_2$—$CH_2$—O—, $R^5$ is hydrogen or alkyl of 1–4 carbons, $R^6$ is hydrogen, oxyl, hydroxyl, alkyl of 1–20 carbons, alkenyl or alkynyl of 3–8 carbons, aralkyl of 7–12 carbons, aliphatic acyl of 1–10 carbons, aromatic acyl of 7–13 carbons, alkoxycarbonyl of 2–9 carbons, aryloxycarbonyl of 7–15 carbons, alkyl, aryl, cycloalkyl or aralkyl substituted carbamoyl of 2–13 carbons, hydroxyalkyl of 1–5 carbons, 2-cyanoethyl, epoxyalkyl of 3–10 carbons or a polyalkylene oxide group of 4–20 carbons, y is 1, 2 or 3 and optional substituents for rings A and B are one or more of alkyl or 1–8 carbons, alkoxy of 1–8 carbons, chlorine or bromine.

7. The composition of claim 1 in which (e) is

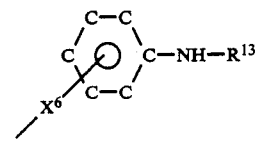

where $R^{13}$ is aryl of 6–14 carbons, alkyl of 1–12 carbons or cycloalkyl of 5–12 carbons and $X^6$ is a direct bond.

8. The composition of claim 1 in which (f) is

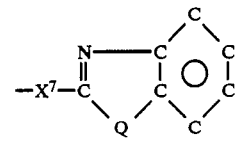

where Q is —NH—, —S— or —O—, $X^7$ is a direct bond and the aromatic nucleus is optionally substituted with one or more of hydroxy, alkyl of 1–8 carbons or alkoxy of 1–8 carbons.

9. The composition of claim 1 in which (h) is

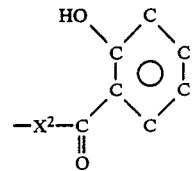

where $X^2$ is a divalent radical —$CH_2$—$CH_2$—O— or —$R^7$—$N(R^{23})$— wherein $R^7$ is alkylene of 2–12 carbons, $R^{23}$ is hydrogen, alkyl of 1–10 carbons, aryl of 6–12 carbons, aralkyl of 7–12 carbons, cycloalkyl of 5–12 carbons or 2-cyanoethyl, and the aromatic nucleus is optionally substituted with one or more of hydroxy, alkyl of 1–8 carbons or alkoxy of 1–8 carbons.

10. The composition of claim 1 in which (g) is

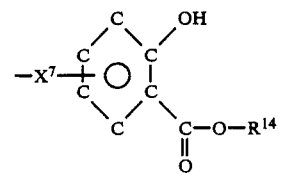

where $R^{14}$ is aryl of 6–10 carbons, optionally substituted with one or more of alkyl of 1–8 carbons, alkoxy of 1–8 carbons, chlorine or bromine and $X^7$ is a direct bond.

11. The composition of claim 1 in which (i) is

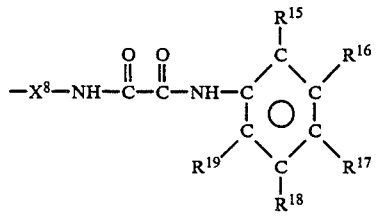

wherein $R^{15}$, $R^{16}$, $R^{17}$, $R^{18}$ and $R^{19}$ are independently hydrogen, hydroxyl, alkoxy of 1–12 carbons, alkylthio of 1–12 carbons, acyloxy of 2–12 carbons, acylthio of 2–12 carbons, alkyl of 1–8 carbons, aryl of 6–12 carbons, chlorine, bromine, aralkyl of 7–13 carbons, alkaryl of 7–13 carbons or alkoxycarbonyl of 2–8 carbons and $X^8$ is alkylene of 2–12 carbons, arylene of 6–12 carbons, aralkylene of 7–13 carbons or alkenylene of 2–13 carbons.

12. The composition of claim 3 in which at least one of the groups attached to the polymer is (b) in which $R^5$ is hydrogen or methyl, $R^6$ is hydrogen, methyl, acetyl, benzoyl, 2-hydroxyethyl or benzyl and $X^9$ is a direct bond, —$(CH_2)_y$— or —$R^7$—$N(R^{23})$—, where $R^7$ is alkylene of 2–10 carbons and $R^{23}$ is hydrogen, alkyl of 1–4 carbons or 2,2,6,6-tetramethyl-4-piperidinyl.

13. The composition of claim 12 in which one of the other groups attached to the polymer is (d) having a structure

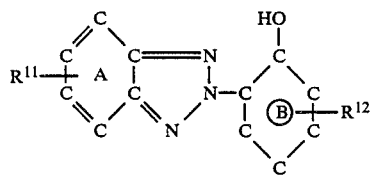

in which $R^{11}$ is hydrogen or chlorine, $R^{12}$ is $X^5$ and $X^5$ is —$(CH_2)_y$— or —$CH_2$—$CH_2$—$O$—, an optional substituent for Ring B being alkyl of 1–8 carbons.

14. The composition of claim 12 in which one of the other groups attached to the polymer is (c) having a structure

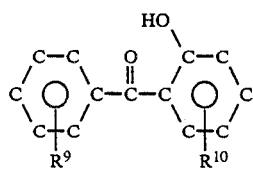

in which $R^9$ is hydrogen, hydroxyl or alkoxy of 1 to 4 carbons, $R^{10}$ is the connecting group $X^3$ and $X^3$ is —$CH_2$—$CH_2$—$O$—.

15. The composition of claim 12 in which one of the other groups attached to the polymer is (a) having a structure

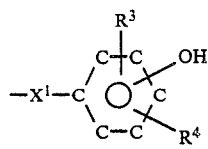

in which the hydroxyl group is in the 4 position, $R^3$ and $R^4$ are independently t-butyl or t-amyl where at least one of the t-alkyl groups is ortho to the hydroxyl group and $X^1$ is a direct bond or a divalent radical —$(CH_2)_y$— or —$CH_2$—$CH_2$—$O$— in which y is 1, 2 or 3.

16. The composition of claim 12 in which one of the other groups attached to the polymer is (g) having a structure

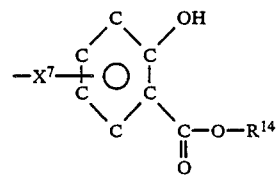

where $R^{14}$ is aryl of 6–10 carbons optionally substituted with one or more of alkyl of 1–8 carbons, chlorine or bromine and $X^7$ is a direct bond.

17. The composition of claim 12 in which one of the other groups attached to the polymer is (i) having a structure

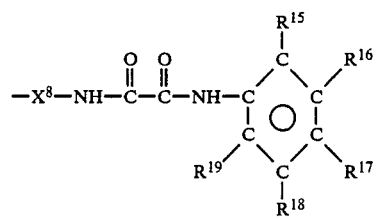

wherein $R^{15}$, $R^{16}$, $R^{17}$, $R^{18}$ and $R^{19}$ are independently hydrogen, hydroxyl, alkyl of 1–4 carbons or alkoxy of 1–4 carbons, and $X^8$ is alkylene of 2–12 carbons, arylene of 6–12 carbons, aralkylene of 7–13 carbons, or alkenylene of 2–13 carbons.

18. The composition of claim 2 in which at least one of the groups attached to the polymer is (a) in which the hydroxyl group is in the 4 position, $R^3$ and $R^4$ are independently t-butyl or t-amyl where at least one of the t-alkyl groups is ortho to the hydroxyl group, $X^1$ is a direct bond or a divalent radical —$(CH_2)_y$— or —$CH_2$—$CH_2$—$O$— and y is 1, 2 or 3.

19. The composition of claim 18 in which one of the other groups attached to the polymer is (j) having a structure

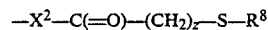

in which $R^8$ is alkyl of 6–18 carbons, benzyl or dimethylaminoethyl, $X^2$ is —$R^7$—$N(R^{23})$—, $R^7$ is alkylene of 2–6 carbons and $R^{23}$ is hydrogen.

20. The composition of claim 18 in which one of the other groups attached to the polymer is (c) having a structure

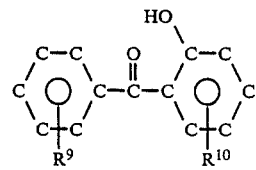

in which $R^9$ is hydrogen, hydroxyl or alkoxy of 1–4 carbons, $R^{10}$ is the connecting group $X^3$ and $X^3$ is the diradical —$CH_2$—$CH_2$—$O$—.

21. The composition of claim 18 in which one of the other groups attached to the polymer is (d) having a structure

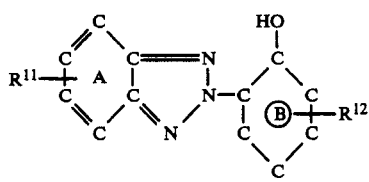

in which $R^{11}$ is hydrogen or chlorine, $R^{12}$ is $X^5$, $X^5$ is $-(CH_2)_y-$ or $-CH_2-CH_2-O-$ and y is 1 or 2, an optional substituent for Ring B being alkyl of 1-8 carbons.

22. The composition of claim 18 in which one of the other groups attached to the polymer is (e) having a structure

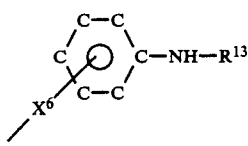

in which $R^{13}$ is aryl of 6-10 carbons or alkyl of 1-12 carbons and $X^6$ is a direct bond.

23. The composition of claim 5 in which at least one of the groups attached to the polymer is (c) in which $R^9$ is hydrogen, hydroxyl or alkoxy of 1 to 4 carbons, $R^{10}$ is the connecting group $X^3$ and $X^3$ is $-CH_2-CH_2-O-$.

24. The composition of claim 23 in which one of the other groups attached to the polymer is (h) having a structure

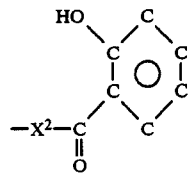

in which
$X^2$ is $-R^7-N(R^{23})-$, wherein
$R^7$ is alkylene of 2-12 carbons,
$R^{23}$ is hydrogen, alkyl of 1-10 carbons, aryl of 6-12 carbons, aralkyl of 7-12 carbons, cycloalkyl of 5-12 carbons or 2-cyanoethyl.

25. The composition of claim 23 in which one of the other groups attached to the polymer is (f) having a structure

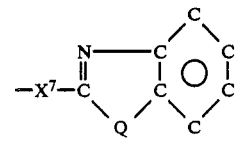

in which Q is $-NH-$, $-S-$ or $-O-$ and $X^7$ is a direct bond.

* * * * *